(12) United States Patent
Matsumura et al.

(10) Patent No.: US 11,201,771 B2
(45) Date of Patent: Dec. 14, 2021

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 135 days.

(21) Appl. No.: 16/464,157

(22) PCT Filed: Nov. 24, 2017

(86) PCT No.: PCT/JP2017/042142
§ 371 (c)(1),
(2) Date: May 24, 2019

(87) PCT Pub. No.: WO2018/097218
PCT Pub. Date: May 31, 2018

(65) Prior Publication Data
US 2020/0322199 A1 Oct. 8, 2020

(30) Foreign Application Priority Data
Nov. 25, 2016 (JP) .............................. JP2016-229441

(51) Int. Cl.
*H04L 27/26* (2006.01)
*H04L 5/00* (2006.01)

(52) U.S. Cl.
CPC ........ *H04L 27/2613* (2013.01); *H04L 5/0007* (2013.01); *H04L 5/0048* (2013.01); *H04L 27/2607* (2013.01)

(58) Field of Classification Search
CPC ....... H04L 5/00; H04L 5/0007; H04L 5/0048; H04L 5/0051; H04L 5/0053;
(Continued)

(56) References Cited

U.S. PATENT DOCUMENTS 8,149,938 B2 * 4/2012 Shen ..................... H04L 27/206
375/261
10,805,911 B2 * 10/2020 Matsumura ......... H04L 27/2613
(Continued)

OTHER PUBLICATIONS

Intel Corporation, UL control channel design with long duration, 3GPP TSG-RAN WG1 #87, R1-1611995, 5 pages, Nov. 18, 2016.*
(Continued)

*Primary Examiner* — Frank Duong
(74) *Attorney, Agent, or Firm* — Osha Bergman Watanabe & Burton LLP

(57) ABSTRACT

A user terminal that includes a transmitter that transmits uplink control information on an uplink control channel and a controller that bases the transmission of the uplink control information on a number of symbols of the uplink control channel. The transmission of the uplink control information uses one of a first uplink control channel format and a second uplink control channel format, and the first uplink control channel format uses a cyclic shift that depends on the uplink control information, and the second uplink control channel format does not use a cyclic shift that depends on the uplink control information.

7 Claims, 25 Drawing Sheets

(58) Field of Classification Search
CPC ..... H04L 5/0055; H04L 5/0057; H04L 27/26; H04L 27/2607; H04L 27/2613; H04W 72/04; H04W 72/085

See application file for complete search history.

(56) References Cited

U.S. PATENT DOCUMENTS

| | | | |
|---|---|---|---|
| 2012/0113831 A1* | 5/2012 | Pelletier | H04L 5/0058 370/252 |
| 2018/0124815 A1* | 5/2018 | Papasakellariou | H04W 72/042 |
| 2018/0132264 A1* | 5/2018 | Jung | H04L 1/1812 |
| 2018/0279291 A1* | 9/2018 | Tiirola | H04B 1/713 |
| 2019/0068423 A1* | 2/2019 | Hwang | H04L 5/00 |
| 2019/0104007 A1* | 4/2019 | Wang | H04W 72/0413 |
| 2019/0223201 A1* | 7/2019 | Lee | H04W 72/1268 |
| 2020/0007280 A1* | 1/2020 | Kim | H04L 5/0012 |

OTHER PUBLICATIONS

Intel Corporation, UL control channel design with short duration, 3GPP TSG-RAN WG1 #87, R1-1611994, 6 pages, Nov. 18, 2016.*

CMCC, Further discussion on uplink control channel design for NR, 3GPP TSG RAN WG1 Meeting #87, R1-1612191, 5 pages, Oct. 18, 2016.*

Hou et al, Uplink Control Channel for 5G New RAT, IEEE, 7 pages, 2017.*

Mitsubishi Electric, On common RS design between DFT-S-OFDM and OFDM, 3GPP TSG-RAN WG1 #87, R1-1612375, 4 pages, Nov. 14-18, 2016.*

Extended European Search Report issued in the counterpart European Patent Application No. 17873675.7, dated Sep. 11, 2020 (8 pages).

LG Electronics; "Overall structure of UL control channel for NR"; 3GPP TSG RAN WG1 Meeting #87, R1-1611840; Reno, USA, Nov. 14-18, 2016 (6 pages).

International Search Report issued for PCT/JP2017/042142, dated Feb. 13, 2018 (4 pages).

Written Opinion issued for PCT/JP2017/042142, dated Feb. 13, 2018 (4 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Ericsson; "Summary of e-mail discussions on uplink control signaling"; TSG-RAN WG1 #87 R1-1613162; Reno, USA, Nov. 14-18, 2016 (23 pages).

LG Electronics; "Design of one-symbol UL control channel for NR"; 3GPP TSG RAN WG1 Meeting #87 R1-1611842; Reno, USA, Nov. 14-18, 2016 (4 pages).

Qualcomm Incorporated; "NR numerology scaling and alignment"; 3GPP TSG-RAN WG1 #86-BIS R1-1610131; Lisbon, Portugal, Oct. 10-14, 2016 (5 pages).

Office Action issued in the counterpart African Patent Application No. AP/P/2019/011609, dated May 11, 2021 (4 pages).

Office Action in counterpart European Patent Application No. 17873675.7 dated Jun. 28, 2021 (6 pages).

Office Action issued in counterpart Indian Application No. 201917021150 dated Sep. 7, 2021 (6 pages).

* cited by examiner

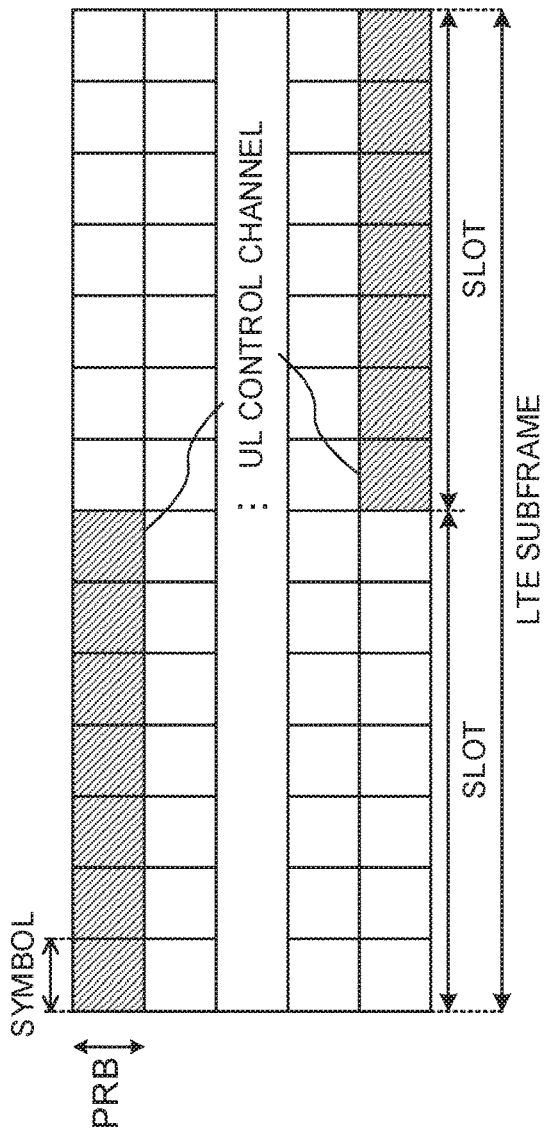
FIG. 1A
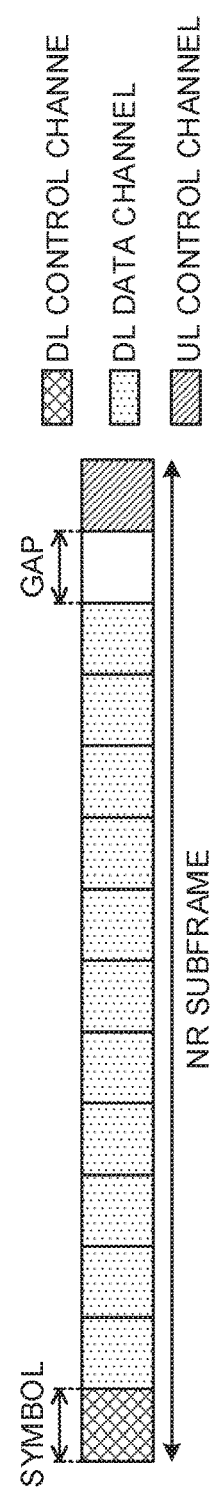
FIG. 1B DL CENTRIC
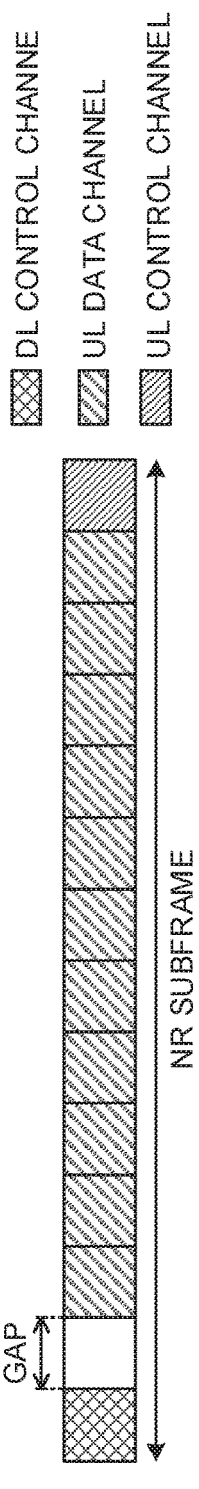
FIG. 1C UL CENTRIC

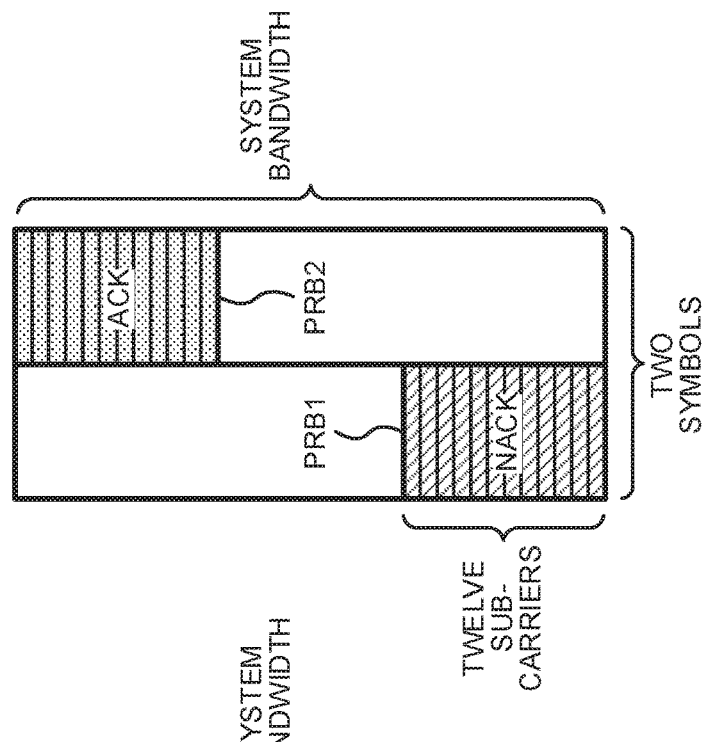
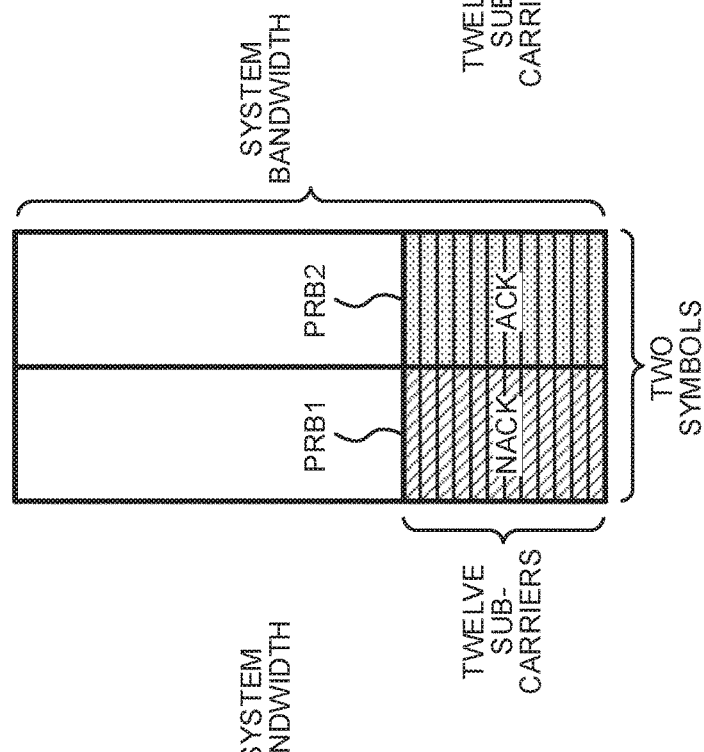
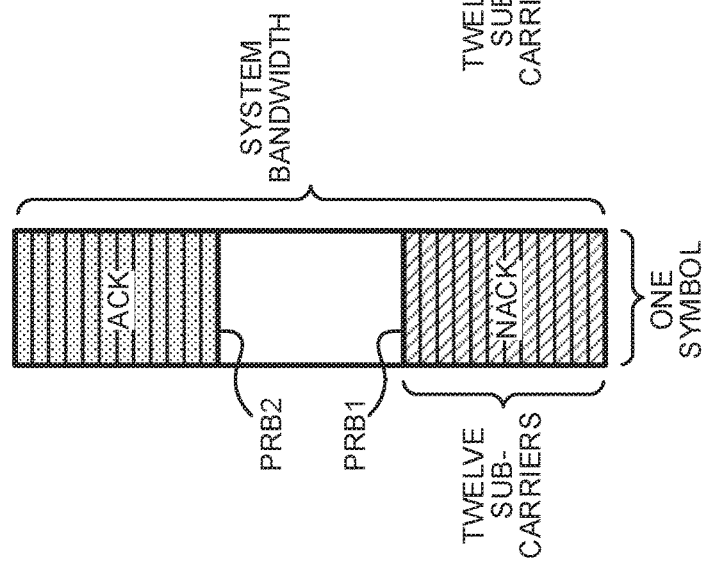

FIG. 5A
| UL/DL DATA CHANNEL COMMUNICATION SCHEME | UL CONTROL CHANNEL TYPE |
|---|---|
| OFDM | TYPE 1 |
| DFT-S-OFDM | TYPE 2 OR 3 |
FIG. 5B
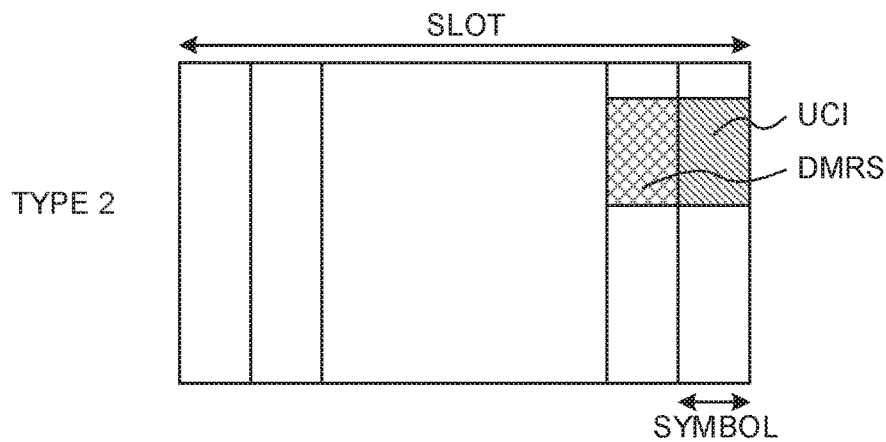
IF UL/DL DATA CHANNEL IS CONFIGURED IN DFT-S-OFDM AND THE NUMBER OF UL CONTROL CHANNEL SYMBOLS IS CONFIGURED TO BE TWO OR MORE OR EVEN NUMBER
FIG. 5C
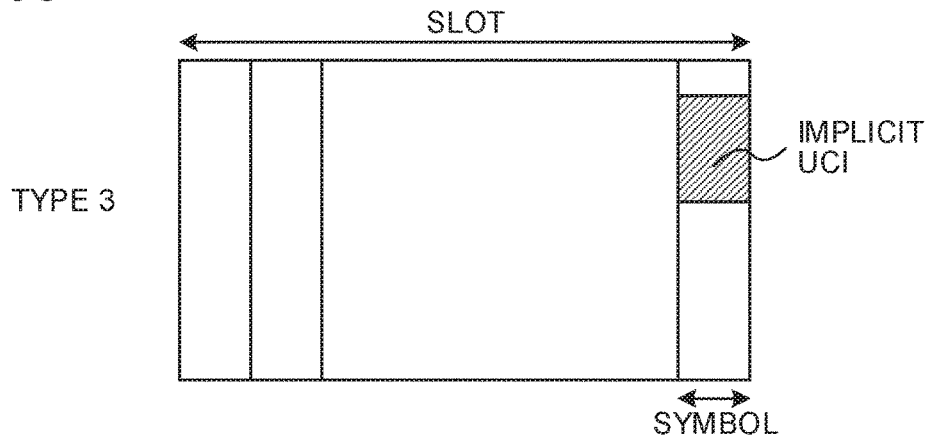
IF UL/DL DATA CHANNEL IS CONFIGURED IN DFT-S-OFDM AND THE NUMBER OF UL CONTROL CHANNEL SYMBOLS IS CONFIGURED TO BE ONE OR ODD NUMBER

UE#1 (TYPE 1, ORTHOGONAL CODE A)

UE#2 (TYPE 1, ORTHOGONAL CODE B)

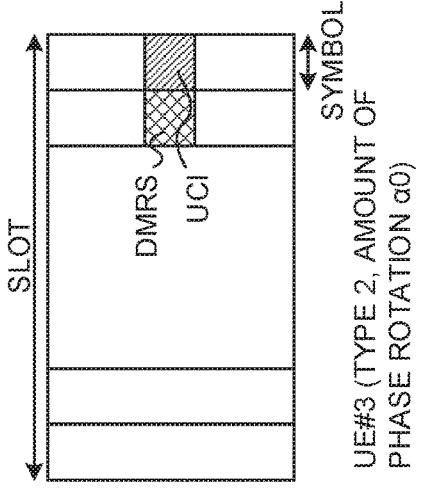
FIG. 10A
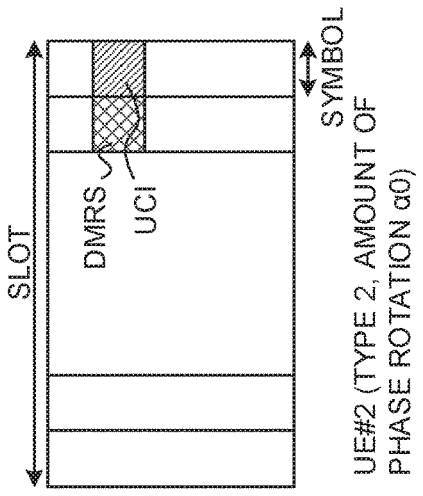
FIG. 10B
FIG. 10C
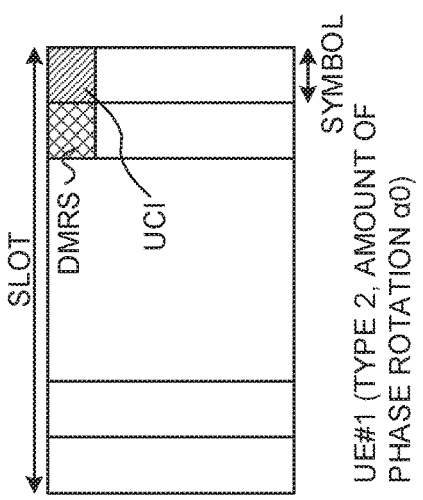
FIG. 10D
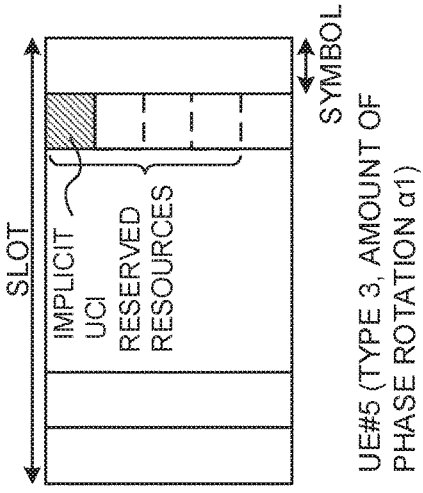
FIG. 10E
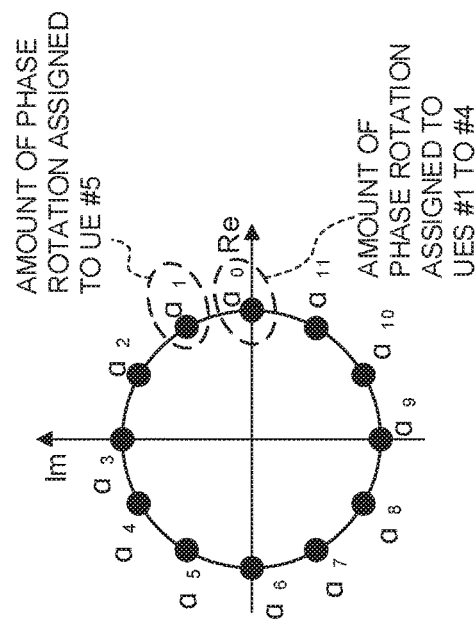
FIG. 10F

| UL/DL DATA CHANNEL COMMUNICATION SCHEME | UL CONTROL CHANNEL TYPE |
|---|---|
| OFDM | TYPE 1 |
| DFT-S-OFDM | TYPE 2, 3, 2s, and 3s |

FIG. 13

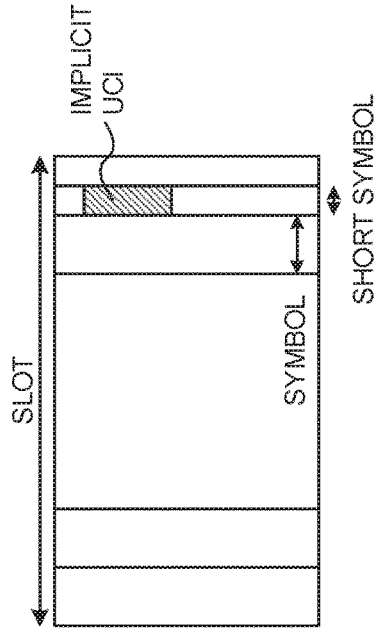

FIG. 14A

TYPE 3
IF THE NUMBER OF SYMBOLS OF UL CONTROL CHANNEL IS CONFIGURED TO BE TWO OR MORE OR EVEN NUMBER IN FIRST USER TERMINAL CATEGORY (SUCH AS mMTC)

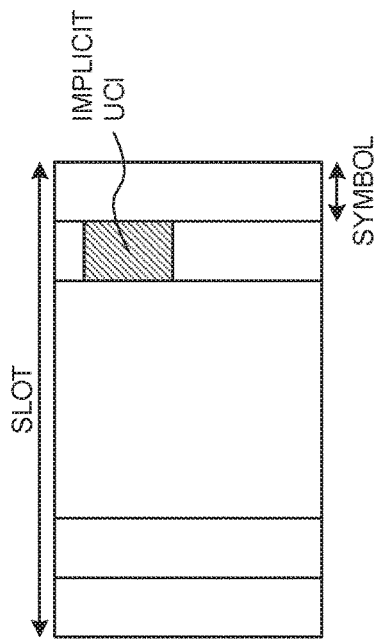

FIG. 14B

TYPE 3S
IF THE NUMBER OF SYMBOLS OF UL CONTROL CHANNEL IS CONFIGURED TO BE ONE OR ODD NUMBER IN FIRST USER TERMINAL CATEGORY (SUCH AS mMTC)

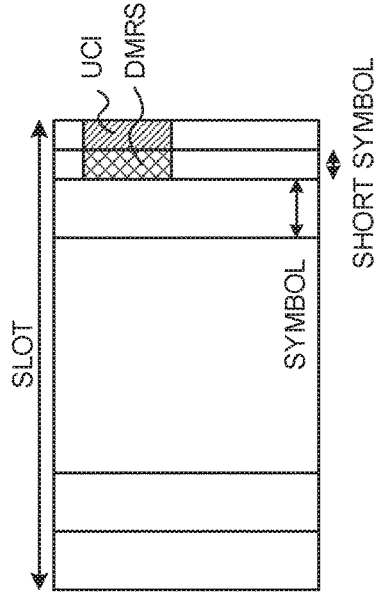

FIG. 14C

TYPE 2
IF THE NUMBER OF SYMBOLS OF UL CONTROL CHANNEL IS CONFIGURED TO BE TWO OR MORE OR EVEN NUMBER IN SECOND USER TERMINAL CATEGORY (SUCH AS eMBB)

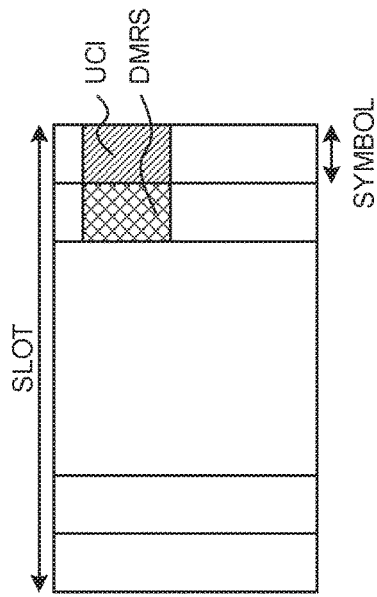

FIG. 14D

TYPE 2S
IF THE NUMBER OF SYMBOLS OF UL CONTROL CHANNEL IS CONFIGURED TO BE ONE OR EVEN NUMBER IN SECOND USER TERMINAL CATEGORY (SUCH AS eMBB)

IF UL/DL DATA CHANNEL COMMUNICATION SCHEME IS OFDM

IF UL/DL DATA CHANNEL COMMUNICATION SCHEME IS DFT-S-OFDM

USER TERMINAL AND RADIO COMMUNICATION METHOD

CROSS REFERENCE TO RELATED APPLICATIONS

The present application is a national phase application of PCT/JP2017/042142 filed on Nov. 24, 2017, which claims priority to Japanese Patent Application No. 2016-229441, filed on Nov. 25, 2016. The contents of these applications are incorporated by reference in their entirety.

TECHNICAL FIELD

The present invention relates to a user terminal and a radio communication method in next-generation mobile communication systems.

BACKGROUND

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+ (plus)," "NR (New Radio)," "NX (New radio access)," "New RAT (Radio Access Technology)," "TX (Future generation radio access)," "LTE Rel. 13," "LTE Rel. 14," "LTE Rel. 15" or Liter versions) are under study.

In LTE Rel. 10/11, carrier aggregation (CA) to integrate multiple component carriers (CCs) is introduced in order to achieve broadbandization. Each CC is configured with the system bandwidth of LTE Rel. 8 as one unit. Furthermore, in CA, a plurality of CCs of the same radio base station (referred to as an "eNB (evolved Node B)," a "BS (Base Station)" and so on) are configured in a user terminal (UE (User Equipment)).

Meanwhile, in LTE Rel. 12, dual connectivity (DC), in which multiple cell groups (CGs) formed by different radio base stations are configured in UE, is also introduced. Each cell group is comprised of at least one cell (CC). Since multiple CCs of different radio base stations are integrated in DC, DC is also referred to as "inter-eNB CA."

Also, in LTE Rel. 8 to 12, frequency division duplex (FDD), in which downlink (DL) transmission and uplink (UL) transmission are made in different frequency bands, and time division duplex (TDD), in which downlink transmission and uplink transmission are switched over time and take place in the same frequency band, are introduced.

Also, in LTE Rel. 8 to 12, HARQ (Hybrid Automatic Repeat reQuest)-based data retransmission control is used. UE and/or the base station receive delivery acknowledgment information (also referred to as "HARQ-ACK," "ACK/NACK," "A/N" and so on) in response to transmitted data, and judge whether or not the data is to be retransmitted, based on this information.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY

Future radio communication systems (for example, 5G, NR, etc.) are expected to realize various radio communication services so as to fulfill varying requirements (for example, ultra-high speed, large capacity, ultra-low latency, etc.).

For example, 5G/NR is under study to provide various radio communication services, referred to as "eMBB (enhanced Mobile Broad Band)," "mMTC (massive Machine Type Communication)," "URLLC (Ultra Reliable and Low Latency Communications)," and so on.

Also, future radio communication systems (for example, LTE Rel. 14, 15 and later versions, 5G, NR, etc.) are anticipated to use subframes (also referred to as "slots," "minislots," "subslots," "radio frames," etc.) of different configurations from those of existing LTE systems (LTE Rel. 13 or earlier versions). For example, these subframes might use UL control channels consisting of fewer symbols (for example, one symbol at the least) than those of existing PUCCH formats 1 to 5. In addition, in these subframes, at least one of a DL control channel, a DL data channel and a UL data channel may be time-division-multiplexed with this UL control channel.

When a UCI (Uplink Control Information) transmission method of existing LTE systems (LTE Rel. 13 or earlier versions) is used in such a future radio communication system, the radio base station may not be able to receive (for example, demodulate, decode, etc.) UCI properly. For example, when an RS and UCI are allocated to different symbols as in existing PUCCH formats 1 to 5, a UL control channel, which is comprised of one symbol, can transmit only one of the RS and the UCI, and it is likely that user terminals cannot report UCI to the radio base station adequately. Also, when UCI and an RS are frequency-division-multiplexed in one symbol, an increase in the UCI error rate, a drop in communication throughput, an increase in the PAPR (Peak to Average Power Ratio) and/or the like might surface as problems.

The present invention has been made in view of the above, and it is therefore an object of the present invention to provide a user terminal and a radio communication method, whereby a drop in communication throughput, an increase in the PAPR and/or suchlike problems can be prevented from arising even when a UL control channel consisting of a smaller number of symbols than existing PUCCH formats 1 to 5 is used.

According to one aspect of the present invention, a user terminal has a control section that selects one reporting method out of a plurality of reporting methods, which include at least two of a first reporting method, in which a control signal to represent uplink control information and a reference signal for demodulating the uplink control information are frequency-division-multiplexed and a resulting transmission signal is transmitted in an uplink control channel, a second reporting method, in which the control signal and the reference signal are time division-multiplexed and the resulting transmission signal is transmitted in the uplink control channel, and a third reporting method, in which a transmission signal, not containing the reference signal, is transmitted in the uplink control channel, by using a resource that corresponds to a value of the uplink control information among a plurality of resources allocated, and a transmission section that transmits the transmission signal in the selected reporting method.

According to the present invention, a drop in communication throughput, an increase in the PAPR and/or suchlike problems can be prevented from arising even when a UL control channel consisting of a smaller number of symbols than existing PUCCH formats 1 to 5 is used.

BRIEF DESCRIPTION OF DRAWINGS

FIGS. 1A to 1C are diagrams to show examples of subframe configurations;

FIGS. 3A to 3C are diagrams to show examples of non-coherent transmission;

FIGS. 5A to 5C are diagrams to show examples of methods of UL control channel selection by user terminals;

FIGS. 10A to 10F are diagrams to show examples of multiplexing type 2 user terminals (UEs #1 to #4) and a type 3 user terminal (UE #5);

FIG. 13 is a diagram to show an example of the method of UL control channel selection by user terminals;

FIGS. 14A to 14D are diagrams to show examples of how to report UL control channel types implicitly by using the user terminal category and the number of UL control channel symbols;

DETAILED DESCRIPTION

Figure 2A:
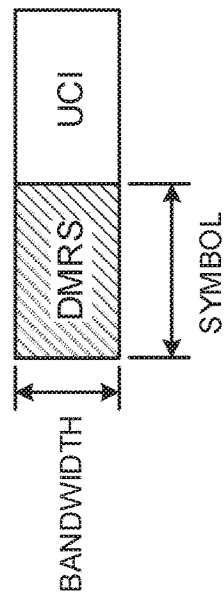
FIGS. 2A to 2C are diagrams to show examples of coherent transmission.

In existing LTE systems (for example, LTE Rel. 8 to 13), downlink (DL) communication and/or uplink (UL) communication are performed using 1-ms transmission time intervals ("TTIs," which may be also referred to as "subframes" and so on). This 1-ms TTI is the unit of time it takes to transmit one channel-encoded data packet, and is the processing unit in, for example, scheduling, link adaptation, retransmission control (HARQ (Hybrid Automatic Repeat reQuest)) and so on.

Also, in the DL of existing LTE systems (LTE Rel. 8 to 13), multi-carrier communication is employed. To be more specific, in the DL, orthogonal frequency division multiplexing (OFDM), which frequency-division-multiplexes (FDM) multiple subcarriers, is used.

On the other hand, in the UL of existing LTE systems (LTE Rel. 8 to 13), single-carrier communication is employed. To be more specific, in the UL, DFT-S-OFDM (Discrete Fourier Transform-Spread-Orthogonal Frequency Division Multiplexing) is used. DFT-S-OFDM has a lower peak-to-average power ratio (PAPR) than OFDM, and therefore suitable for the UL, where user terminals make transmissions.

Also, in UL control channel configurations (for example, PUCCH (Physical Uplink Control CHannel) formats 1 to 5) that are supported in existing LTE systems (for example, LTE Rel. 13), all symbols that are available in a subframe (for example, fourteen symbols if normal cyclic prefix (CP) is used) are used, and frequency hopping is applied in units of slots.

Furthermore, in existing PUCCH formats 1 to 5, uplink control information (UCI) and reference signals (RSs) (for example, the demodulation reference signal (DMRS) for a UL control channel, a channel state sounding reference signal (SRS (Sounding Reference Signal), etc.) are allocated to different symbols in the subframe. That is, in existing PUCCH formats 1 to 5, UCI and RSs are time-division-multiplexed (TDM).

Note that UCI contains at least one of retransmission control information (ACK (ACKnowledgement) or NACK (Negative ACK), A/N, HARQ-ACK, etc.) in response to a DL data channel (DL data), channel state information (CSI), and a scheduling request (SR). Furthermore, UCI may be transmitted in a UL control channel, or transmitted using a UL data channel (for example, PUSCH (Physical Uplink Shared CHannel)) that is allocated to a user terminal.

FIG. 1 are diagrams to show examples of subframe configurations. Note that subframe configurations may be referred to as "subframe structures," "subframe types," "mini-subframe configurations/structures/types," "frame configurations/structures/types," "slot configurations/structures/types," "mini-slot configurations/structures/types," "subslot configurations/structures/types," "transmission time interval (TTI) configurations/structures/types," and so on.

FIG. 1A shows an example of UL subframe configuration in LTE. In LTE UL subframes, PUCCH is transmitted in one PRB (Physical Resource Block), accompanied by frequency hopping applied between slots. For example, the duration of a subframe is fourteen symbols, and the time duration of a slot is seven symbols. PUCCH is placed in the PRB at one end of the system band in the first slot, a placed in the PRB at the other end of the system band in the next slot.

FIGS. 1B and 1C show examples of subframe configurations, where a downlink control channel (for example, PDCCH (Physical Downlink Control CHannel)), a UL/DL data channel (for example, PDSCH (Physical Downlink Shared CHannel), PDSCH, etc.) and an uplink control channel (for example, PUCCH) are allocated in subframes. Note that "UL/DL" may be read as "UL and/or DL." Subframes configured like that in FIG. 1B may be referred to as "NR subframes," "NR TDD subframes" and so on.

FIG. 1B shows an example of the configuration of a subframe that transmits DL data (referred to as a "DL-centric configuration," for example), among NR subframes. In a DL-centric configuration, a DL control channel (for example, PDCCH), a DL data channel (for example, PDSCH, which is also referred to as "DL shared channel" and so on), and a UL control channel (for example, PUCCH) are allocated. A user terminal controls receipt of the DL data channel based on downlink control information (DCI) that is transmitted in the DL control channel.

In this DL-centric configuration, the user terminal can feed back retransmission control information (also referred to as "HARQ-ACK (Hybrid Automatic Repeat reQuest-Acknowledgment)," "ACK" or "NACK" ("ACK/NACK," "A/N," etc.) and/or the like) in response to the DL data channel via the UL control channel in the same time period (for example, in the same transmission time interval (TTI)," in the same "subframe," and so on). Note that the user terminal may feed back this ACK/NACK in the UL control channel or the UL data channel in subsequent subframes.

FIG. 1C shows an example of the configuration of a subframe that transmits UL data (referred to as a "UL centric configuration," for example) among NR subframes. In this UL-centric configuration, a DL control channel (for example, PDCCH), a UL data channel (for example, PDSCH, which is also referred to as a "UL shared channel" and so on), and a UL control channel (for example, PUCCH) are allocated. Based on DCI that s transmitted in the DL control channel, a user terminal may transmit the UL data channel (UL data, channel state information (CSI), etc.) in the same subframe. Note that the user terminal ay transmit this UL data channel in subsequent subframes.

Envisaging 5G/NR, HARQ that is asynchronous between the DL and the UL is under study. In this case, dynamic uplink control channel allocation is preferably supported, to transmit HARQ-ACKs in the UL.

DL-centric and UL-centric configurations are subject to such allocation where transmission/receipt control (scheduling) is complete within the same subframe. This type of assignment is referred to as "self-contained assignment." Also, subframes that are subject to self-contained assignment are referred to as "self-contained subframes," "self-contained TTIs," "self-contained symbol sets" and so on.

Note that the subframe, structures shown in FIGS. 1B and 1C are simply examples, and by no means limiting. The locations of individual channels can be switched as appropriate, and it is also possible to place only part of the channels shown in FIGS. 1B and 1C in subframes. Also, the bandwidths shown in FIGS. 1B and 1C have only to accommodate the bandwidth to allocate to the data channel, and need not match the system bandwidth.

Also, although varying channels are time-divided in FIGS. 1B and 1C, the DL control channel and the UL/DL data channel need not be time-multiplexed, and may be frequency-multiplexed/code-multiplexed in the same time period (for example, in the same symbol). Likewise, the UL control channel and the UL/DL data channel need not be time-multiplexed and may be frequency-multiplexed/code-multiplexed in the same time period (for example, in the same symbol).

Also, as illustrated in FIGS. 1B and 1C, a time (gap period) to switch from the DL to the UL may be provided between the DL data channel and the UL control channel. Also, as shown in FIG. 1C, a gap period of one symbol may be provided between the DL control channel and the UL data channel. These gap periods may be two or more symbols, or and do not have to consist of an integer number of symbols.

Also, in FIGS. 1B and 1C, the UL/DL control channels are each comprised of one symbol, but these UL/DL control channels may be comprised of multiple symbols as well (for example two or three symbols). When the number of symbols in a UL/DL control channel is configured large, the coverage can be expanded, but the overhead will increase. Therefore, in order to prevent an increase in overhead, it may be possible to configure a UL/DL control channel with, for example, one symbol at the least. When a UL control channel is formed with a smaller number of symbols, resources for transmitting DRMSs and/or other reference signals, and UCI, will be limited.

As for the method of reporting UCI, a method of multiplexing and reporting UCI with the DMRS that is required to demodulate the UCI (may be referred to as "Coherent Transmission," "Coherent Design," etc.) may be possible.

FIG. 2 is a diagram to show an example of coherent transmission. UCI that is reported based on this UCI reporting method is detected by the network (for example, base station) using DMRSs.

In coherent transmission, as shown in FIG. 2A, a DMRS (also referred to as a "reference signal") and UCI (also referred to as a "control signal") can be time-division-multiplexed (TDM) in a UL control channel. The method of time-division-multiplexing a DMRS and UCI (TDM) requires a UL control channel of at least two symbols. Also, when a UL control channel consists of a small number of symbols, the proportion of the DMRS to the whole transmission signal is likely to be large, and the DMRS overhead significant.

Figure 2C:
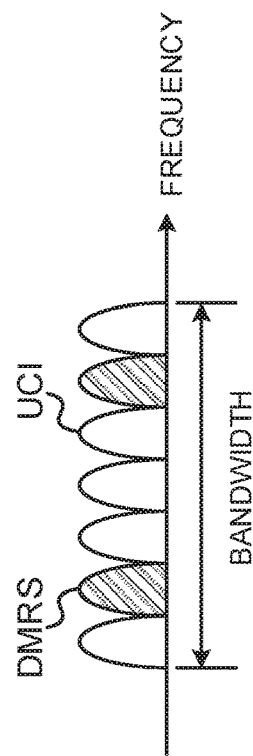
Figure 2B:
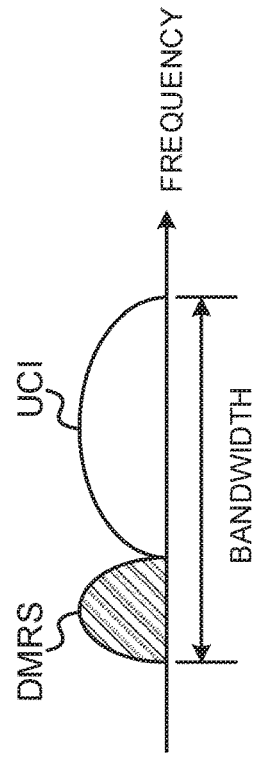

In coherent transmission, as shown in FIGS. 2B and 2C, a DMRS and UCI may be frequency-division-multiplexed (FDM) in a UL control channel. When this method of frequency-division-multiplexing a DMRS and UCI (FDM), the resulting signal can be transmitted in a one-symbol UL control channel.

When the UL control channel communication scheme is based on single-carrier communication (for example, DFT-spread OFDM (DFT-S-OFDM)), its advantages include, for example, low PAPR. However, if, as shown in FIG. 2B, a DMRS and UCI are frequency-division-multiplexed (FDM) based on single-carrier communication, the PAPR might rise, and the advantages of single-carrier communication may be lost.

When the UL control channel communication scheme is based on multi-carrier communication (for example, OFDM), as shown in FIG. 2C, DMRSs and UCI are allocated different subcarriers and frequency-division-multiplexed. In multi-carrier communication, the increase in the PAPR is less likely to be a big problem.

As another method of reporting UCI in a UL control channel, a method of reporting UCI in transmission signals that do not contain DMRSs may be possible (which may be referred to as "non-coherent transmission," "non-coherent design" and so on). UCI that is reported in non-coherent transmission is detected by the network, without requiring DMRSs.

The resources for use for coherent transmission, shown in FIG. 2, are allocated from the network.

For non-coherent transmissions, for example, a method of reporting UCI by using the locations of transmission resources (also referred to as, for example, "resource blocks (RBs)," "physical resource blocks (PRBs))," and so on) is under research.

FIG. 3 are diagrams to show examples of non-coherent transmission. In the examples in these drawings, UCI is ACKs/NACKs (A/Ns) in response to DL data. In the examples of these drawings, the network allocates multiple PRBs, which are orthogonal to each other, to one user terminal, as UCI-reporting resources. For example, the network allocates (reserves) two PRBs (PRB 1 and PRB 2 in the drawing), per bit, to a user terminal. The user terminal transmits a predetermined signal (for example, a predetermined sequence) using one of the PRBs allocated. For example, when a NACK is fed back, this NACK is transmitted in PRB 1, and, when an ACK is fed back, this ACK is transmitted in PRB 2. The base station judges whether an ACK is fed back or a NACK is fed back depending on in which PRB location the above predetermined signal is detected.

In the example shown in FIG. 3A, two PRBs, corresponding to a pair of an ACK and a NACK, respectively, are frequency-division multiplexed (FDM) in one symbol. In the example shown in FIG. 3B, these two PRBs are time-division-multiplexed (TDM) over two symbols. In the example shown in FIG. 3C these two PRBs hop over two symbols. In the non-coherent transmission of FIG. 3A, a UL control channel can be transmitted in one symbol at the least.

In the coherent transmissions of FIG. 2, UCI is modulated in QAM (Quadrature Amplitude Modulation), for example, and demodulated based on DMRSs. In the non-coherent transmissions of FIG. 3, on the other hand, UCI is modulated in OOK (On Off Keying). Therefore, non-coherent transmission has higher error rates than coherent transmission.

Note that, in FIG. 3, PRBs corresponding to ACKs/NACKs are allocated at the end of the system band these resources are by no means limiting. Furthermore, in FIG. 3, the radio resource field used to report UCI is configured in units of (one PRB×one symbol), but this is by no means limiting. In this specification, frequency resources for reporting UCI may configured in any bandwidth, and does not have to be one PRB, and time resources for reporting UCI may be configured to have any duration (for example, one subframe, one slot, one subslot, etc.), and does not have to be one symbol.

Note that the user terminal may report one bit of information depending on whether or not a predetermined signal is transmitted in one resource allocated by the network.

Although an example is described here where ACKs/NACKs are the UCI to be reported, this is by no means limiting. UCI to be reported may contain SRs, CSI, and so on. For example, instead of an ACK/NACK, whether or not an SR is present may be reported using UCI-reporting resources.

Also, ACKs/NACKs may be bundled. For example, ACKs/NACKs corresponding to multiple codewords may be bundled in the space domain, or ACK/NACK corresponding to multiple time points may be bundled in the time domain.

As mentioned above, each UCI reporting method has advantages and disadvantages. Furthermore, like 5G/NR is anticipated to switch between OFDM and DFT-S-OFDM, future radio communication systems might use a number of methods to transmit a UL control channel, in which the time duration of the UL control channel, the communication scheme of the UL control channel and/or others vary. Depending on the method of reporting UCI, problems such as an increase in the error rate of UCI, a drop in communication throughput, an increase in the PAPR, and so on might arise.

So, the present inventors have come up with the idea of providing a number of UCI reporting methods for use for UL control channels consisting of fewer symbols than existing UL control channels, and allowing user terminals to select between these UCI reporting methods. By this means, even when a UL control channel is transmitted in various ways, it is possible to use a suitable method to report UCI.

Now, embodiments of the present invention will be described in detail below with reference to the accompanying drawings. The radio communication methods according to individual embodiments may be applied alone or may be applied in combination.

Radio Communication Method

First Embodiment

In the first embodiment of the present invention, a number of UCI reporting methods are provided, and a user terminal selects between these UCI reporting methods. Hereinafter, the kinds of UCI reporting methods may be referred to as "types," or may be referred to as "formats." Note that expressions such as "UE uses type X," "type X is configured in UE," and so on may be interpreted to suggest the phrase "as the UCI control channel type" accompanies.

In the first embodiment, type 1, type 2, and type 3 are defined as UL control channel types. FIG. 4 provide diagrams to show examples of types of UL control channels.

Figure 4A:
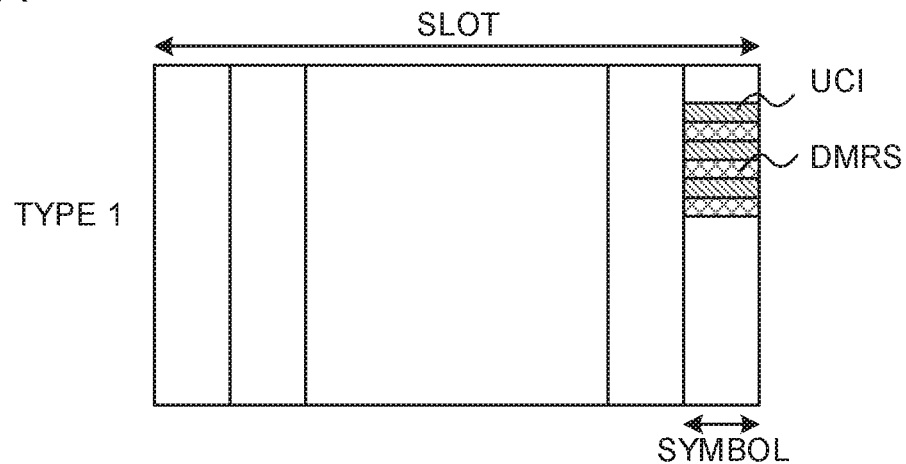
FIGS. 4A to 4C are diagrams to show examples of types of UL control channels.

When type 1 shown in FIG. 4A is used, a DMRS and UCI are frequency-division-multiplexed (FDM) in one symbol of the UL control channel, as in FIG. 2C. The advantage of type 1 is that the DMRS overhead can be made low.

Figure 4B:
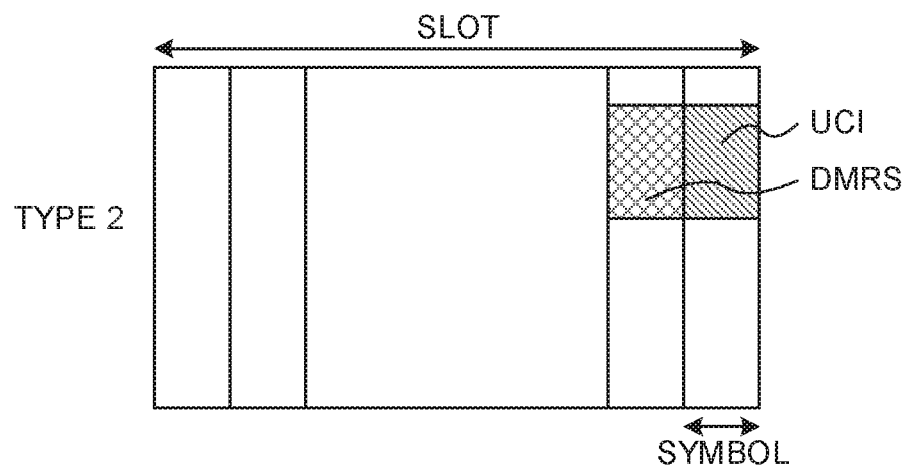

When type 2 shown in FIG. 4B is used, a DMRS and UCI are time-division-multiplexed (TDM) over a number of symbols of the UL control channel, as in FIG. 2A. The advantage of type 2 is that the PAPR can be made low by using single-carrier communication. Note that multi-carrier communication may be applied to type 2. Type 2 requires a UL control channel that consists of at least two symbols.

Figure 4C:
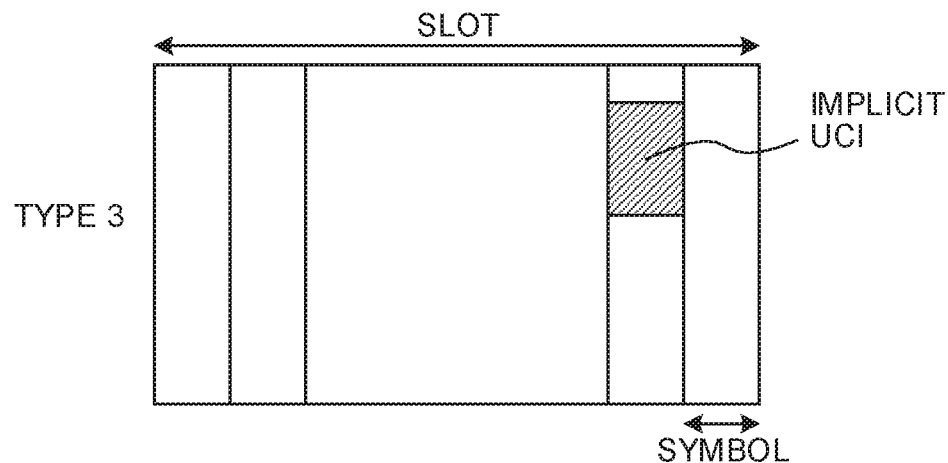

When type 3 shown in FIG. 4C is used, UCI is reported without using a DMRS (non-coherent transmission), as in FIG. 3. The advantage of type 3 is that single-carrier communication is possible and PAPR can be made low. Also, the advantage of type 3 is that the UL control channel can be transmitted in one symbol at the least. As shown in these drawings, the transmission signal when UCI is reported implicitly by way of non-coherent transmission may be referred to as "implicit UCI."

The UL control channel types may be configured in user terminals by the network. For example, the UL control channel type may be reported using cell-specific information such as broadcast information (MIB: Master Information Block), system information blocks (SIBs) and so on, or may be reported via higher layer signaling (for example, RRC (Radio Resource Control) signaling, MAC (Medium Access Control) signaling, etc.) and/or physical layer control information (for example, DCI), on a per user terminal basis. A user terminals may select (determine) the UCI reporting method depending on what type of UL control channel is configured.

The user terminal may select the UL control channel type. Furthermore, the user terminal may select the UL control channel type based on parameters configured in the user terminal. These parameters may include at least one of the communication scheme of the UL/DL data channel (for example, OFDM, DFT-S-OFDM, etc.), the communication scheme of the UL control channel (for example, OFDM, DFT-S-OFDM), the time duration (for example, the number of symbols) of the UL control channel, and information regarding subcarrier spacing (for example, the ratio of the UL control channel's subcarrier spacing to predetermined subcarrier spacing, the ratio of the UL control channel's time duration to the time duration of a predetermined symbol, etc.). Note that communication schemes may be referred to as "transmission signal waveforms."

These parameters may be reported by the network. For example, these parameters may be reported in cell-specific information such as broadcast information, or may be reported via higher layer signaling and/or physical layer control information, on a per user terminal basis. In addition, the parameters may be configured in user terminals in advance. A user terminal may select the UCI reporting method depending on which type of UL control channel is selected. FIG. 5 are diagrams to show examples of methods of UL control channel selection by user terminals.

As shown in FIG. 5A, a number of UL control channel types may be associated, respectively, with a number of candidates for the communication scheme that is configured for the UL/DL data channel. These multiple candidates may include, for example, OFDM and DFT-S-OFDM. In this case, a user terminal may select, for the UL control channel, the UL control channel type that corresponds to the communication scheme configured in the UL/DL data channel. To select the UL control channel type to apply to the UL control channel, the user terminal may refer to the communication scheme of the UL/DL data channel located immediately before the UL control channel, or refer to the communication scheme of the UL/DL, data channel at a predetermined location with respect to this UL control channel.

Note that the UL control channel type is not necessarily selected from all of types 1, 2 and 3. For example, UL control channel type may be selected from two candidates of type 1, 2 and 3.

For example, if OFDM is configured for the UL/DL data channel's communication scheme, the user terminal may select type 1 as the UL control channel type, and, if DFT-S-OFDM is configured for the UL/DL data channel's communication scheme, the user terminal may select type 2 or type 3 as the UL control channel type.

Whether the UL control channel type is type 2 or type 3 when DFT-S-OFDM is configured for the UL/DL data channel's communication scheme may be reported explicitly from the network, or may be reported implicitly by having user terminal determine the UL control channel type based on predetermined information. The explicit report may be sent in cell-specific information such as broadcast information, or may be reported via higher layer signaling and/or physical layer control information on a per user terminal basis.

For example, the UL control channel type may be reported implicitly by configuring the number of UL control channel symbols and allowing the user terminal to select the UL control channel type based on the number of UL control channel symbols. For example, if DFT-S-OFDM is configured for the UL/DL data channel communication scheme and the number of UL control channel symbols is configured to two or more, or an even number, as shown in FIG. 5B the user terminal may select type 2. Also, for example, if DFT-S-OFDM is configured for the UL/DL data channel communication scheme and the number of UL control channel symbols is configured to one or an odd number, as shown in FIG. 5C, the user terminal may select type 3.

Also, a number of UL control channel types may be associated with a number of communication schemes for the UL control channel, respectively. These multiple communication schemes may include OFDM and DFT-S-OFDM. In this case, the user terminal may select the UL control channel communication scheme based on the UL control channel type.

For example, if the UL control channel type is configured to type 1, the user terminal may select OFDM for the UL control channel communication scheme, and, if the UL control channel type is configured to type 2 or type 3, the user terminal may select DFT-S-OFDM for the UL control channel communication scheme. Note that, if the UL control channel type is configured to type 1, the user terminal may select a communication scheme other than OFDM, such as DFT-S-OFDM, as the UL control channel communication scheme, and, if the UL control channel type is configured to type 2 or type 3, the user terminal may select a communication scheme other than DFT-S-OFDM, such as OFDM, as the UL control channel communication scheme.

When the UL control channel type is configured to type 2 or type 3, the user terminal may adjust the communication scheme for the UL control channel to the communication scheme of the UL/DL data channel (that is, the user terminal may assume that these communication schemes are the same). Also, if the UL control channel type is configured to type 3, the user terminal may select DFT-S-OFDM as the communication scheme for the UL control channel, regardless of the communication scheme of the UL/DL, data channel. DFT-S-OFDM can make the coverage bigger than OFDM can. The UL control channel, for example, reports ACKs/NACKs in response to the DL data channel, and therefore is more important than the UL/DL data channel, so that DFT-S-OFDM may be used.

The user terminal may select the signal sequence for transmitting the DMRS and/or UCI based on the type of the UL control channel.

When the user terminal uses type 1 as the UL control channel type, the user terminal may generate UCI's transmission signal sequence by encoding and modulating the UCI information using a predetermined coding method and modulation method. Also, if type 1 is configured for the UL control channel type, the user terminal may use a CAZAC (Constant Amplitude Zero Auto-Correlation) sequence (for example, Zadoff-Chu sequence) for the transmission signal sequence of the DMRS, or use a sequence that is equivalent to a CAZAC sequence (for example, a CG-CAZAC (Computer-Generated CAZAC) sequence) such as one defined in table 5.5.1.2-1 or in table 5.5.1.2-2 of 3GPP TS 36.211.

Here, the amount of phase rotation for the Zadoff-Chu sequence, or information to represent the row and/or column in the table for specifying the sequence equivalent to a CAZAC sequence may be reported from the network to the user terminal.

When type 2 is used as the UL control channel type, for UCI's transmission signal sequence, the user terminal may use the same UCI transmission signal sequence as in type 1, and, for the transmission signal sequence of the DMRS, use the same DMRS transmission signal sequence as in type 1.

When type 3 is used as the UL control channel type, the user terminal may not transmit the DMRS, and may use the DMRS transmission signal sequence of type 1 as the transmission signal sequence of UCI. In type 3, one or more orthogonal resources, which correspond to one or more candidates values of UCI, respectively, may be allocated (reserved) from the network. The user terminal selects a resource corresponding to the value of UCI, and transmits the transmission signal sequence in that resource, and thus reporting the UCI to the network.

Here, the multiple orthogonal resources used to report the UCI have only to be configured to be orthogonal to each other and be used (in dimension) to transmit information, and may be at least one of frequency resources, time resources, predetermined orthogonal codes (for example, spreading codes), predetermined sequences (for example, Zadoff-Chu sequences), different amounts of phase rotation for predetermined sequences (for example, Zadoff-Chu sequences), MIMO (Multi-Input Multi-Output) spatial multiplexing layers.

When type 3 is used, the user terminal does not have to report UCI using of the reserved resources. For example, the user terminal may transmit signals using only part of the reserved resources, as shown FIG. 3.

Also, the examples of FIGS. 5B and 5C assume that the resource for the transmission signal of type 3 is the same time resource and frequency resource as the DMRS resource in type 2, the DMRS of type 2 and the transmission signal of type 3 are multiplexed on resources that are orthogonal to each other.

However, if type 3 is not multiplexed with type 2, the time resource for the transmission signal of type 3 may not be the same time resource as that of the DMRS in type 2, and, for example, the second symbol of the two symbols allocated to type 2 may be used.

Information about the resources for reporting UCI (which may be referred to as "UCI-transmitting resource information") may be configured in (or reported to) the user terminal. The report may be sent, for example, via higher layer signaling (for example, RRC signaling), physical layer signaling (UCI), or a combination of these.

Assuming using at least one of the above mentioned resources, the UCI-transmitting resource information may include information that specifies the locations, values, quantity and so on of resources that are allocated, where these pieces of information may be represented in absolute values or relative values with respect to predetermined references, or may be indicated by indices that are each associated with a location, a value, a quantity and so on of a resource. For example, when frequency sources are used, the UCI-transmitting resource information may be PRB indices and so on, and, when time resources are used, the UCI-transmitting resource information may be subframe indices, symbol indices, and so on.

The UCI-transmitting resource information may include an index that indicates which of the above-noted resources is used to report UCI (the type of resources). For example, when this index is "0," "frequency" may be used, and, when the index is "1," "time" may be used. The associations between the index and the locations, values, quantity, types and so on of resources may be set forth in the specification, or reported to the user terminal via higher layer signaling and/or the like.

A number of orthogonal resources are allocated to a number of user terminals, respectively, and multiplexed, so that multiple user terminals can report UCI by using overlapping resources (for example, time and frequency resources) in the same carrier and in the same slot (or subframe).

Figure 6:
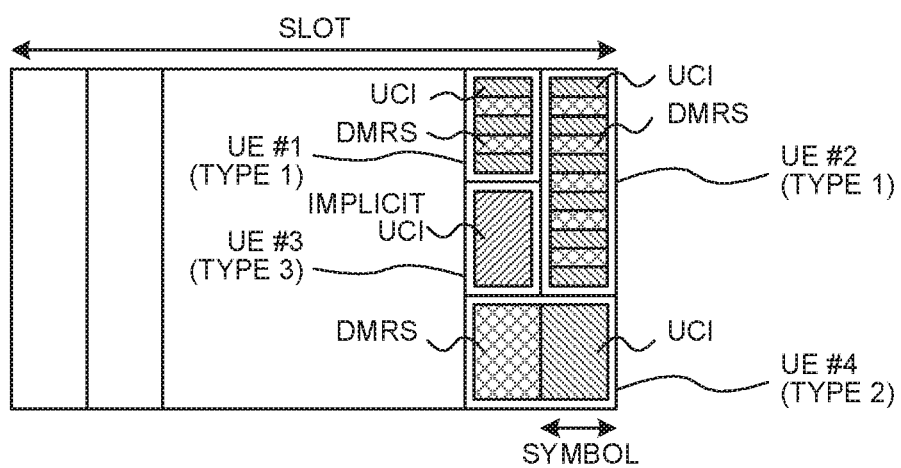
FIG. 6 is a diagram to show an example of multiplexing UL control channels for a number of user terminals by using time resources and/or frequency resources that are orthogonal to each other.

As shown in FIG. 6, time resources and/or frequency resources may be used as orthogonal resources. In this case, UCI reports from multiple user terminals (UEs #1 to #4) are multiplexed on multiple PRBs of different time resources and/or frequency resources. In this case, varying UL control channel types may be used on a per user terminal basis. In the example of this drawing, UE #1 and #2 use type 1, UE #3 uses type 3 and UE #4 uses type 2.

As shown in this drawing, when a transmission signal of type 1 and a transmission signal of type 2 or 3 are multiplexed, the transmission signal of type 2 or 3 may use a different time resource and/or frequency resource from the transmission signal of type 1. Note that it is possible to orthogonalize the transmission signal of type 1 and the transmission signal of type 2 or 3 by using orthogonal codes, MIMO spatial multiplexing layers and so on as orthogonal resources, and multiplex these transmission signals on the same time resource and frequency resource.

Figure 7A:
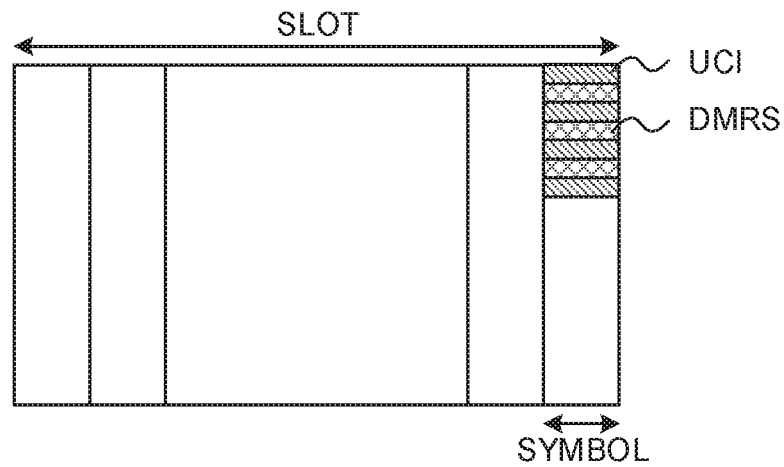
FIGS. 7A and 7B are diagrams to show examples of multiplexing UL control channels for a number of user terminals by using orthogonal codes.
Figure 7B:
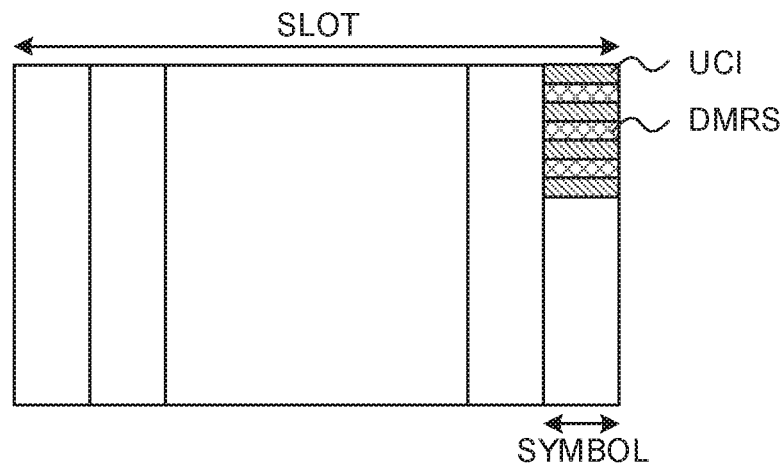

As shown in FIG. 7, the orthogonal resources may be orthogonal codes. In this case, reports of UCI from a plurality of user terminals (UEs #1 and #2) are multiplexed on the same time resource and frequency resource using orthogonal codes that are orthogonal to each other. In this example, UE #1 uses type 1 as shown in FIG. 7A, and UE #2 uses type 1 as shown in FIG. 7B. Also, UE #1 multiplies the UCI and/or the DMRS by orthogonal code A, and UE #2 multiplies the UCI and/or the DMRS by orthogonal code B, which is orthogonal to orthogonal code A. Note that DMRS transmission based on type 2 and UCI reporting based on type 3 may be multiplexed on the same time resource and frequency resource by using, respectively, orthogonal codes that are orthogonal to each other.

The orthogonal resources may be amounts of phase rotation to apply to a CAZAC sequence (for example, a Zadoff-Chu sequence). For example, reports of UCI from a number of user terminals, representing a number of amounts of phase rotation for a Zadoff-Chu sequence, respectively, may be multiplexed on the same time resource and frequency resource. The sequence length of the Zadoff-Chu sequence, which is the base sequence, is determined by the number of subcarriers. Here, assuming that one PRB is used to report UCI, the number of subcarriers is twelve, and the length of the base sequence is twelve. The base sequence is evenly divided per phase of $2\pi/12$ ($=\pi/6$) and rotated (cyclically-shifted) through every corresponding amount of phase rotation ($\alpha_0$-$\alpha_{11}$), and the twelve resulting sequences are orthogonal to each other. The DMRS of type 1 or type 2 and the transmission signal of type 3 use Zadoff-Chu sequences with varying amounts of phase rotation, and therefore can be multiplexed on the same time resource and frequency resource.

FIG. 8 are a diagram to show examples of multiplexing a type 2 user terminal (UE #1) and a type 3 user terminal (UE #2). Note that the assignments of amounts of phase rotation shown in FIG. 8 are examples, and are by no means limiting. The same applies to the later drawings.

Figure 8A:
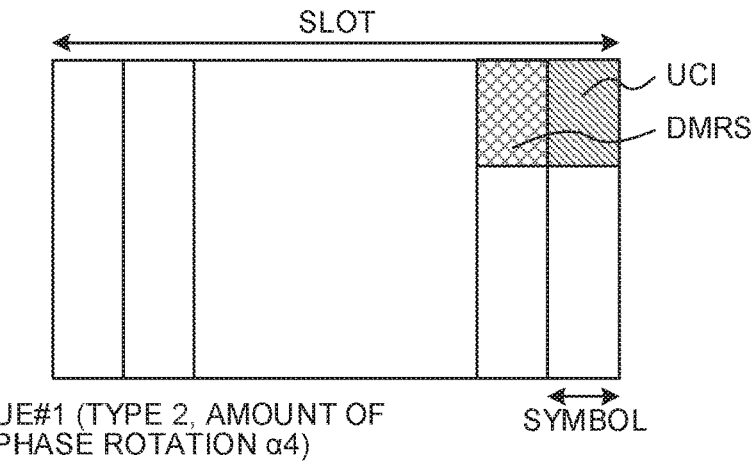
FIGS. 8A to 8C are diagrams to show examples of multiplexing a type 2 user terminal (UE #1) and a type 3 user terminal (UE #2)

As shown in FIG. 8A, when UE #1 uses type 2, depending on the value of UCI, UE #1 does not have to select the amount of phase rotation. Therefore, as shown in FIG. 8C, one amount of phase rotation $\alpha_4$ is assigned to UE #1. UE #1 transmits the sequence given by rotating the phase of the base sequence through phase rotation amount $\alpha_4$ as the DMRS.

Figure 8B:
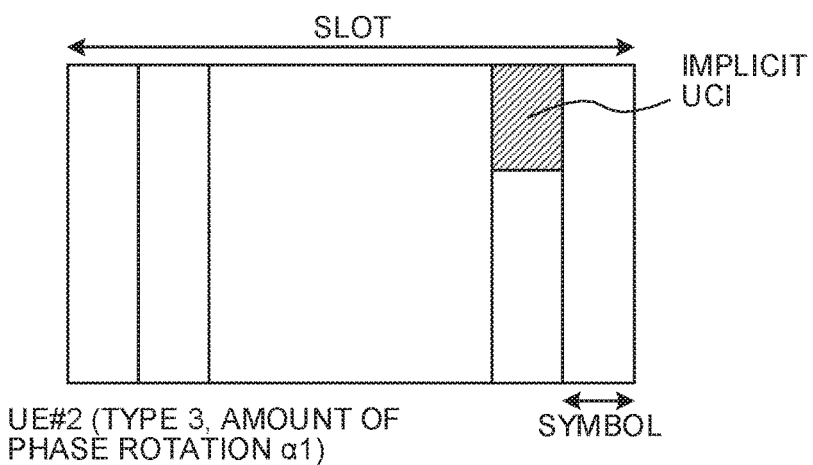
Figure 8C:
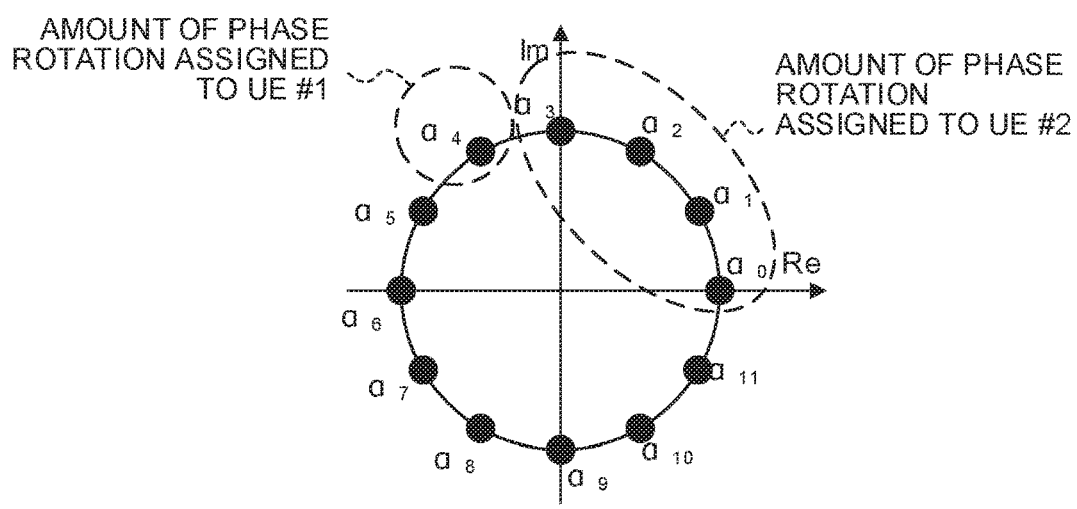

As shown in FIG. 8B, UE #2 uses type 3, and, where four amounts of phase rotation correspond to four candidate UCI values that can be represented by two bits, selects one that correspond to the UCI's value, and reports two-bit UCI. Therefore, as shown in FIG. 8C, the set of four amounts of phase rotation $\alpha_0$, $\alpha_1$, $\alpha_2$ and $\alpha_3$ is assigned to UE #2. For example, UE #2 selects $\alpha_1$, and transmits the sequence given by rotating the phase of the base sequence through phase rotation amount $\alpha_1$ in the same time resource (symbol) and frequency resource (PRB) as those of the DMRS of UE #1.

Note that, out of the twelve amounts of phase rotation shown in FIG. 8C, the amounts of phase rotation that are left after the assignment to UEs #1 and #2—namely, $\alpha_5$, $\alpha_6$, $\alpha_7$, $\alpha_8$, $\alpha_9$, $\alpha_{10}$ and $\alpha_{11}$—may be assigned to other user terminals.

That is, in the examples of FIG. 8A and FIG. 8B, the DMRS of UE #1 and the transmission signal of UE #2 are multiplexed using amounts of phase rotation that are orthogonal to each other. Also, UE #3 reports the value of UCI by using one of multiple amounts of phase rotation that are orthogonal to each other.

The amount of phase rotation, or a set of amounts of phase rotation, may be reported to each user terminal via higher layer signaling and/or physical layer signaling.

Note that, as described above, the orthogonal resources (dimensions) used for type 3 are not limited to the amounts of phase rotation to apply Zadoff-Chu sequences. For example, Zadoff-Chu sequences may be used as orthogonal resources. In this case, reports of UCI from a plurality of user terminals may be multiplexed on the same time resource and frequency resource by using a plurality of Zadoff-Chu sequences, respectively.

FIG. 9 are diagrams to show examples of multiplexing type 2 user terminals (UEs #1 and #2) and a type 3 user terminal (UE #3).

Figure 9A:
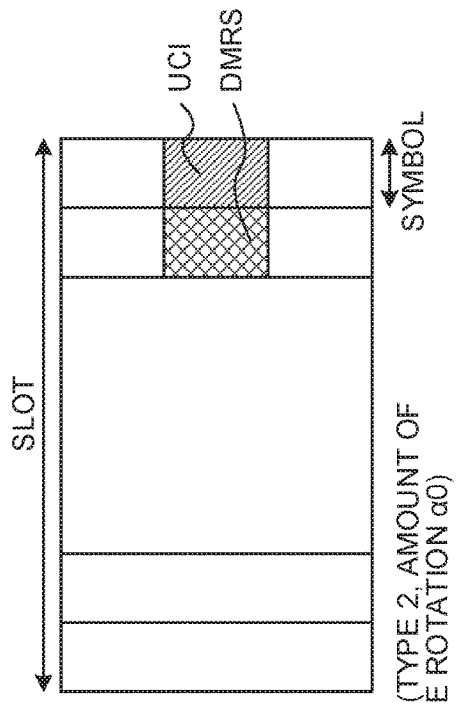
FIGS. 9A to 9D are diagrams to show examples of multiplexing type 2 user terminals (UEs #1 and #2) and a type 3 user terminal (UE #3)
Figure 9B:
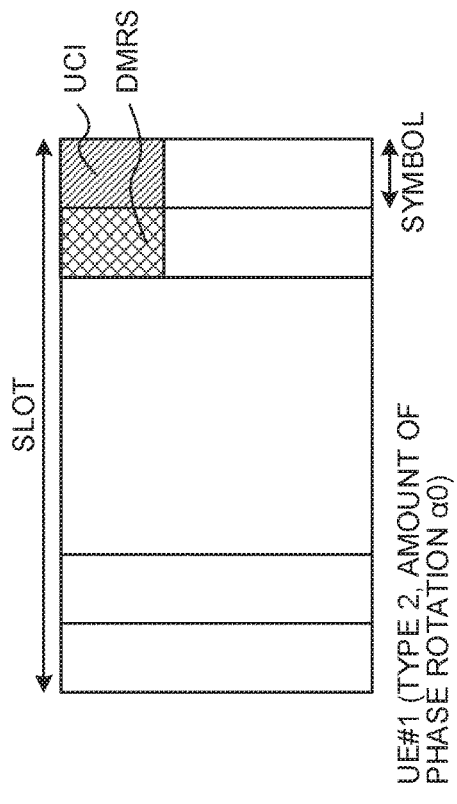

As shown in FIG. 9A, UE #1 uses type 2. As shown in FIG. 9B, UE #2 uses type 2, and uses a frequency resource different from that of UE #1 in the same time resource as that of UE #1. As shown in FIG. 9D, one amount of phase rotation $\alpha_0$ is assigned to UE #1 and UE #2. UEs #1 and #2 transmit the sequence given by rotating the phase of the base sequence through phase rotation amount $\alpha_0$ as the DMRS. Since the frequency resource of UE #1 is different from the frequency resource of UE #2, the same amount of phase rotation $\alpha_0$ can be used.

Figure 9C:
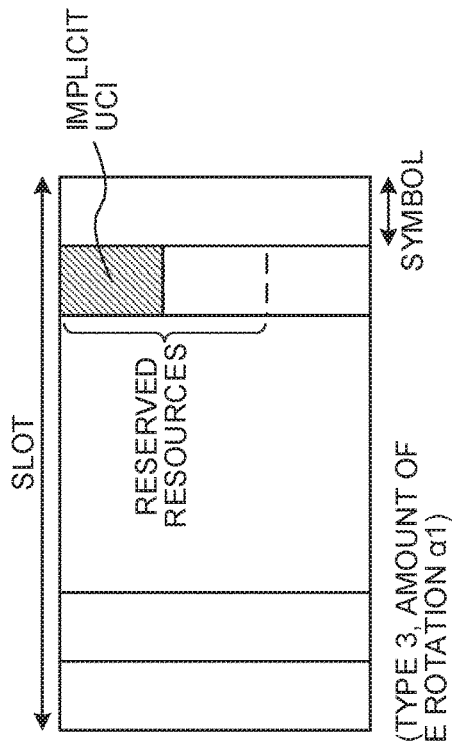
Figure 9D:
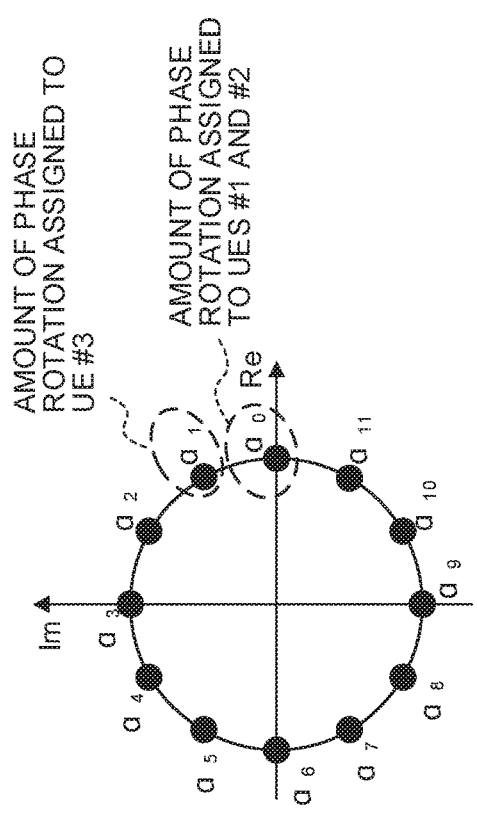

As shown in FIG. 9C, UE #3 uses type 3. In accordance with the UCI reporting method of FIG. 3A, UE #3 reports UCI by selecting a frequency resource that corresponds to the UCI's value, from a number of frequency resources reserved in association with a number of candidate UCI values, respectively, and transmitting the transmission signal sequence. In the example of this drawing, UE #3 reports one bit of UCI depending on in which one of two frequency resources adjacent to each other the transmission signal sequence is transmitted. As shown in FIG. 9D, one amount of phase rotation $\alpha_1$ is assigned to UE #3, UE #3 transmits the sequence given by rotating the phase of the base sequence through phase rotation amount $\alpha_1$ as the transmission signal sequence. Note that UE #3 is not limited to the UCI reporting method of FIG. 3A, and may report UCI using other UCI reporting methods, such as the methods shown in FIGS. 3B and 3C.

Even when the transmission signal of UE #3 is transmitted in the same time resource and frequency resource as those of the DMRS # of UE #1 or #2 as shown in FIGS. 9A to 9C, the amount of phase rotation $\alpha_1$ for UE #3 is different from the amount of phase rotation $\alpha_0$ for UEs #1 and #2, as shown in FIG. 9D, so that the transmission signal of UE #3 can be made orthogonal to the DMRS of UE #1 or #2.

As shown in FIG. 9D, even when the same amount of phase rotation $\alpha_0$ is used for the DMRSs of UEs #1 and #2, if UE #1 and UE #2 use different frequency resources as shown in FIGS. 9A and 9B, the DMRSs of UEs #1 and #2 can be made orthogonal.

That is, in the example of FIGS. 9A to 9C the transmission signals of UEs #1 and #2 are multiplexed using frequency resources that are orthogonal to each other. Also, the DMRS of one of UEs #1 and #2 and the transmission signal of UE #3 are multiplexed using amounts of phase rotation that are orthogonal to each other.

FIG. 10 are diagrams to show examples of multiplexing type 2 user terminals (UEs #1 to #4) and a type 3 user terminal (UE #5).

As shown in FIGS. 10A to 10D, UEs #1 to #4 use type 2. Among UEs #1 to #4, UL control channel transmission signals are multiplexed using frequency resources that are orthogonal to each other. As shown in FIG. 10F, one amount of phase rotation $\alpha_0$ is assigned to each of UEs #1 to #4. Each of UEs #1 to #4 transmits the sequence given by rotating phase of the base sequence through phase rotation amount $\alpha_0$ as the DMRS. The DMRSs of UEs #1 to #4 use the same time resource hut use mutually different frequency resources, so that the same amount of phase rotation $\alpha_0$ can be used.

As shown in FIGS. 10A to 10E, UE #5 uses the same time resource as that of the DMRSs of UEs #1 to #4 and the same frequency resource as one of the DMRSs of UEs #1 to #4, to transmit the transmission signal of the UL control channel. As shown in FIG. 10F, the transmission signals of the UL control channels are multiplexed using mutually different amounts of phase rotation between UEs #1 to #4 and UE #5, so that the transmission signal of the UL control cha a UE #5 can be made orthogonal to the DMRSs of UEs #1 to #4.

That is, in the examples of FIGS. 10A to 10E, the transmission signals of the UL control channels of UEs #1 to #4 are multiplexed using frequency resources orthogonal to each other. Also, one of the DMRSs of UEs #1 to #4 and the transmission signal of UE #5 are multiplexed using amounts of phase rotation that are orthogonal to each other.

According to the first embodiment described above, the user terminal is allowed to select the method of reporting UCI, so that, ever when a UL control channel is transmitted in various ways, it is possible to use a suitable method to report UCI.

Second Embodiment

Figure 11A:
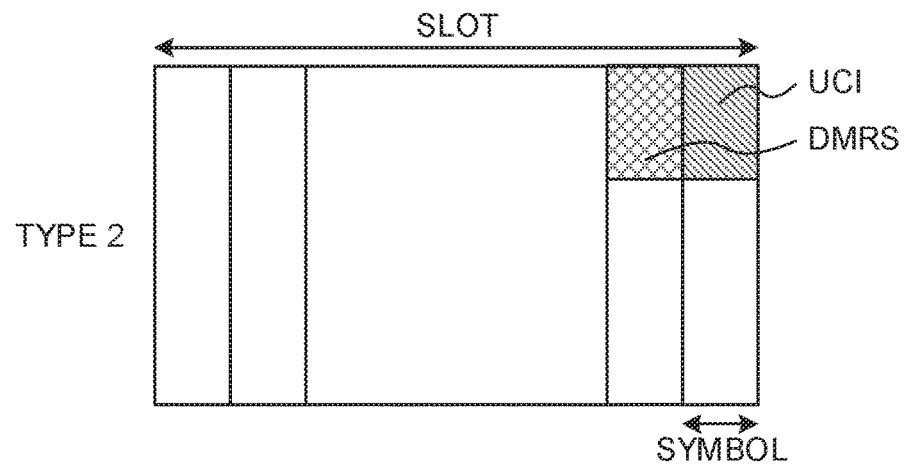
FIGS. 11A and 11B are diagrams to show the number of symbols necessary for type 2 and type 3.
Figure 11B:
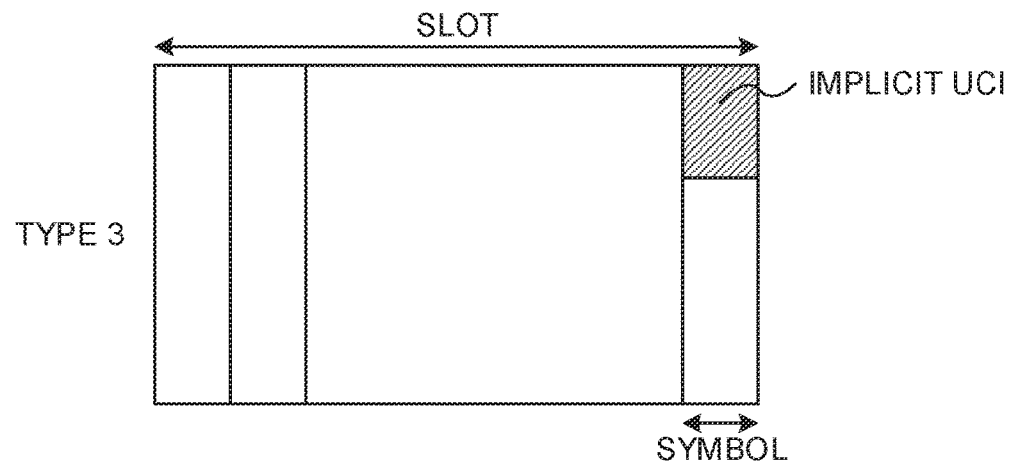

According to the first embodiment, if the UL control channel communication scheme is configured to DFT-S-OFDM, type 2 shown in FIG. 11A or type 3 shown in FIG. 11B may be used as the UL control channel type. Of these, type 2 requires a UL control channel that consists of two or more symbols. When the time duration of the UL control channel is configured to one symbol, type 2 cannot be selected as the UL control of channel type.

Therefore, the present inventors have come up with the idea of providing a UL control channel type that enables UCI and a DMRS to be transmitted in a UL control channel having a time duration of one symbol, even when the UCI and the DMRS are multiplexed by TDM.

In a second embodiment of the present invention, short symbols, which are shorter than symbols (for example, symbols of LTE Rel. 8 to 13, where the symbol duration is about 66.7 μs) are defined, and what UL control channel type is used when the UL control channel uses short symbols is determined. For example, when subcarrier spacing that is twice the subcarrier spacing corresponding to symbols (for example, subcarrier spacing in LTE Rel. 8 to 13, which is 15 kHz) is used, the time duration of a short symbol becomes ½ of the time duration of a symbol.

The following description will assume that the time duration of a short symbol is half the time duration of a symbol, but this is by no means limiting. For example, the subcarrier spacing corresponding to short symbols may be an integer multiple of (for example, N times) the subcarrier spacing corresponding to symbols, or may be a power of two of the subcarrier spacing corresponding to symbols. In this case, the time duration of a short symbol may be 1/N of a symbol's time duration, or may be 1/(a power of two) of the time duration symbol. The user terminal may suspend transmission and/or receipt before and after transmitting the DMRS and/or UCI, in order to switch the subcarrier spacing.

In addition to the UL control channel types defined in the first embodiment, the second embodiment sets forth UL control channel types that use short symbol. FIG. 12 provide diagrams to show examples of UL control channel types that use short symbols. Type 1s, 2s and 3s can be defined as UL control channel types to use short symbols. Type 1s, 2s and 3s are UL control channel types, in which symbols of type 1, 2 and 3 are replaced with short symbols, respectively. Note that the UL control channel type is not necessarily selected from among all of types 1, 2, 3, 1s, 2s and 3s. For example, UL control channel type may be selected from type 1, 2, 3, 2s and 3s.

Figure 12A:
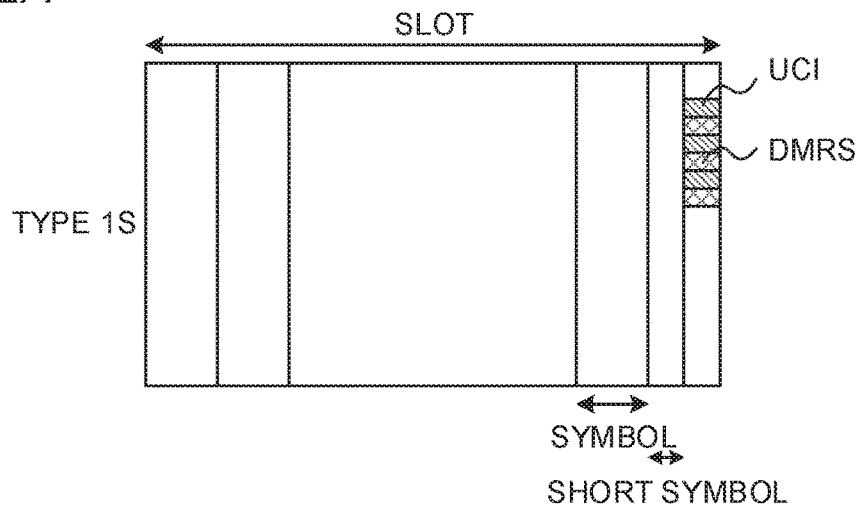
FIGS. 12A to 12C are diagrams to show examples of types of UL control channels that use short symbols.

When type 1s shown in FIG. 12A is used, UCI is frequency-division-multiplexed (FDM) with a DMRS and reported using one short symbol, as with type 1. The advantage of type 1s is that transmission and receipt can be made with low latency, compared to type 1.

Figure 12B:
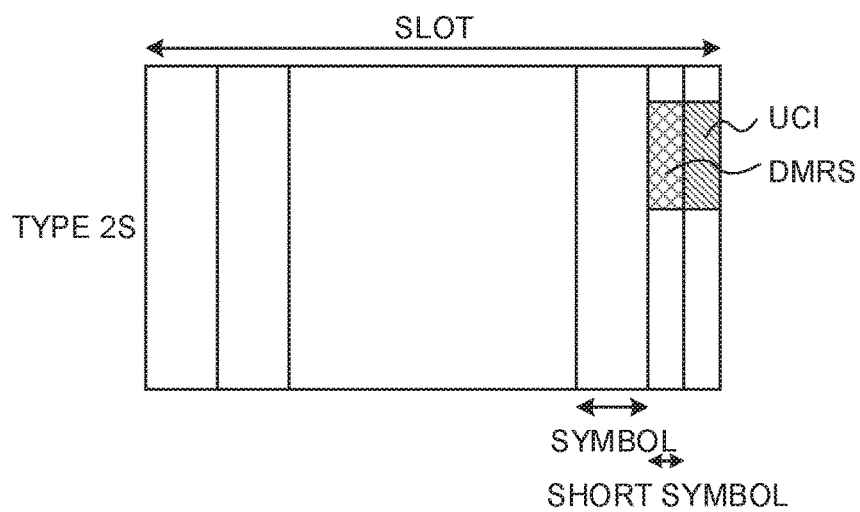

When type 2s shown in FIG. 12B is used, UCI is time-division-multiplexed (TDM) with a DMRS and reported using multiple (for example, two) short symbols, as with type 2. Provided that the time duration of two short symbols is equal to the time, duration of one symbol, the advantage of type 2s is that UCI can be reported even when the time duration of the UL control channel is configured to one symbol.

Figure 12C:
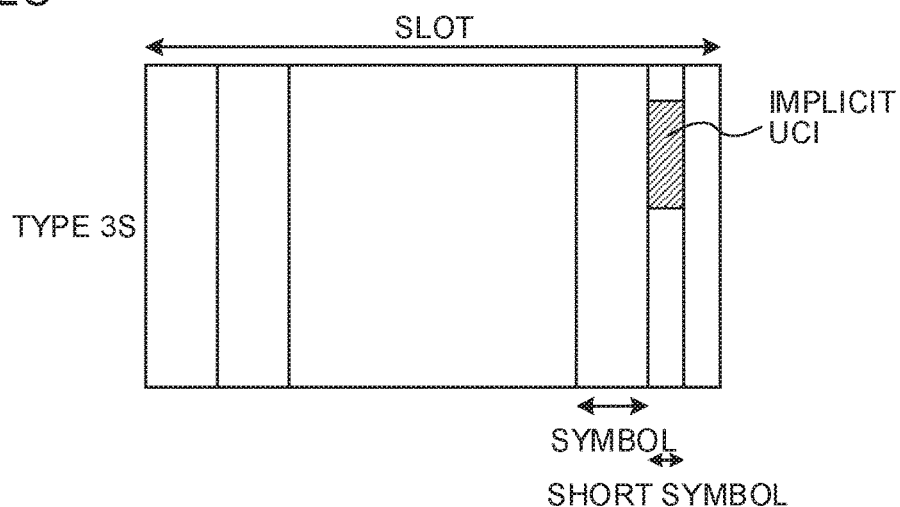
Figure 15:
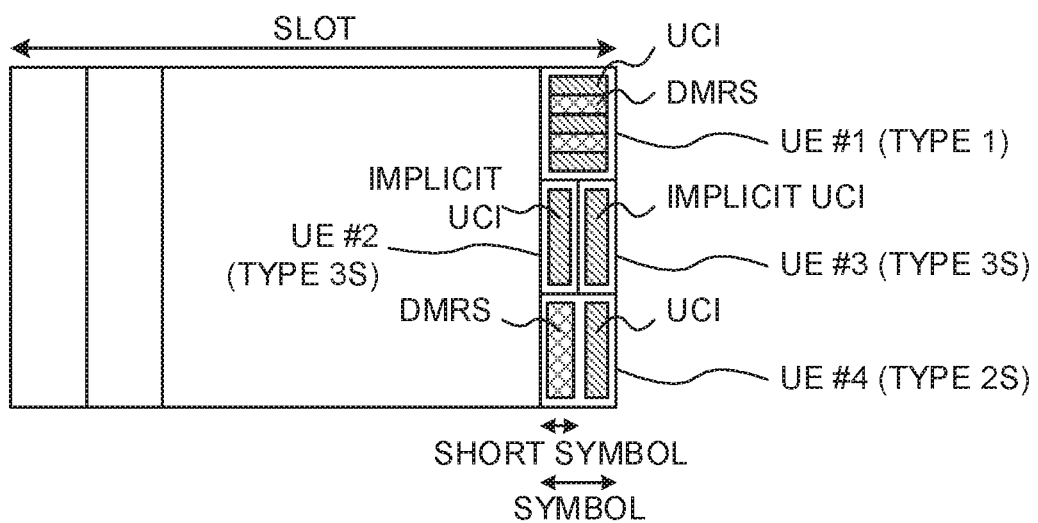
FIG. 15 is a diagram to show art example of multiplexing UL control channels for a number of user terminals by using time resources and/or frequency resources that are orthogonal to each other.

Similar to type 3, type 3s shown in FIG. 12C reports UCI based on whether or not to make transmission in a reserved resource, by using one short symbol, without transmitting a DMRS. The advantage of type 3s is that type 3 and type 2s can be multiplexed in the same time resource and frequency resource by using the same subcarrier spacing as when type 2s is used.

The UL control channel type may be configured by the network. For example, the UL control channel type may be reported using cell-specific information such as broadcast information, or may be reported via higher layer signaling and/or physical layer control information on a per user terminal basis.

A number of UL control channel types may be each associated with a combination of a communication scheme and subcarrier spacing. The user terminal may select the communication scheme and subcarrier spacing that correspond to the UL control channel type reported from the network.

The user terminal may select the UL control channel type. Furthermore, the user terminal may select the UL control channel type based on parameters configured in the user terminal. These parameters are the same as in the first embodiment. These parameters may be reported by the network. For example, these parameters may be reported using cell-specific information such as broadcast information, or may be reported via higher layer signaling and/or physical layer control information on a per user terminal basis. In addition, these parameters may be configured in the user terminal in advance, FIG. 13 is a diagram to show an example of the method of UL control channel selection by a user terminal. As shown in this drawing, a number of UL control channel types may be associated, respectively, with a number of candidate communication schemes that are configured in the UL/DL data channel. These multiple candidates may include OFDM and DFT-S-OFDM. In this case, for a UL control channel, the user terminal may select the UL control channel type that corresponds to the communication scheme of the UL/DL data channel. Candidates of the UL control channel type to be selected by the user terminal may be some UL control channel types. For example, type 1s is not included as a candidate UL control channel type in the example of this drawing.

For example, when OFDM is configured for the UL/DL data channel's communication scheme, the user terminal selects type 1 as the UL control channel type, and, when DFT-S-OFDM is configured for the UL/DL data channel's communication scheme, the user terminal selects one of type 2, type 3, type 2s, and type 3s as the UL control channel type. Note that the user terminal may use type 1s instead of type 1.

Whether the UL control channel type is type 2, type 3, type 2s or type 3s when DFT-S-OFDM is configured for the UL/DL data channel's communication scheme may be reported explicitly from the network, or may be reported implicitly by having the user terminal determine the UL control channel type based on predetermined information. This explicit report may be sent using cell-specific information such as broadcast information, or may be reported via higher layer signaling and/or physical layer control information on a per user terminal basis.

The UL control channel type may be reported implicitly by having the user terminal select the UL control channel type based on the parameters reported from the network. For example, it is possible to configure the time duration (the number of symbols) of the UL control channel, and allow the user terminal to select the UL control channel type based on the capability of the user terminal and the number of UL control channel symbols. The capability of the user terminal may be indicated by the category of the user terminal.

Note that, also in the first embodiment, the user terminal may select the UL control channel type based on the user terminal's capability (the user terminal's category, and/or the like) in addition to or instead of parameters.

FIG. 14 are diagrams to show examples of reporting UL control channel types implicitly by using user terminal categories and numbers of UL control channel symbols.

If DFT-S-OFDM is configured for the UL/DL data channel communication scheme and the category of the user terminal is a specific first user terminal category, the user terminal may select type 3 or type 3s as shown in FIGS. 14A and 14B. The first user terminal category is, for example, a category of IoT (Internet of Things) terminals such as mMTC, for example. In this case, if the number of UL control channel symbols is configured to be two or more, or an even number, the user terminal may select type 3 as shown in FIG. 14A, and, ※ if the number of UL control channel symbols is configured to one or an odd number, the user terminal may select type 3s as shown in FIG. 14B.

Also, for example, when the UL/DL data channel communication scheme is configured to DFT-S-OFDM and the category of the user terminal is a specific second user terminal category, the user terminal selects type 2 or type 2s as shown in FIGS. 14C and 14D. The second user terminal category may be, for example, a user terminal category that is different from mMTC. The second user terminal category may be a category for eMBB, or may be a category for eMBB and URLLC. In this case, if the number of UL control channel symbols is configured to be two or more, or an even number, the user terminal may select type 2 as shown in FIG. 14C, and, if the number of UL control channel symbols is configured to one or an odd number, the user terminal may select type 2s as shown in FIG. 14D.

Also, FIGS. 14A and 14C assume that the resource for the transmission signal of type 3 is the same time source and frequency resource as the resource for the DMRS of type 2, and the DMRS of type 2 and the transmission signal of type 3 are multiplexed by using resources that are orthogonal to each other.

However, if type 3 is not multiplexed with type 2, the time resource for the transmission signal of type 3 needs not be the same time resource as that of the DMRS of type 2, and, for example, the second symbol of the two symbols allocated for type 2 may be used.

Likewise, FIGS. 14B and 14D assume that the resource for the transmission signal of type 3s is the same time resource and frequency resource as the resource for the DMRS of type 2s, and the DMRS of type 2s and the transmission signal of type 3s are multiplexed on resources that are orthogonal to each other. In this case, the subcarrier spacing of type 3s is adjusted to the subcarrier spacing of type 2s.

However, if type 3s is not multiplexed with type 2s, the time resource for the transmission signal (implicit UCI) of type 3s needs not be the same time resource for example, the first short symbol of two short symbols) as that of the DMRS of type 2s, and, for example, the second short symbol of the two short symbols allocated for type 2s may be used.

Note that, instead of or in addition to user terminal categories, carrier service types (eMBB, URLLC, and so on) may be used as the basis for selecting the UL control channel type.

A number of orthogonal resources are allocated to UL control channels for a number of user terminals, respectively, and multiplexed thereon, so that multiple user terminals can report UCI using overlapping resources (for example, time and frequency resources) in the same carrier and in the same subframe.

The orthogonal resources may be time resources and/or frequency resources. In this case, the transmission signals of the UL control channels of a number of user terminals (UEs #1 to #4) are multiplexed on a number of PRBs having different time resources and/or frequency resources. Here, the UL control channel type may vary per user terminal. In the example of this drawing, UE #1 uses type 1, and transmits the transmission signal of the UL control channel in one symbol. UE #2, using type 3s, transmits the transmission signal of the UL control channel in one short symbol. UE #3, using type 3s, transmits the transmission signal of the UL control channel in one short symbol. Here, the same frequency resource is allocated to UE #2 and UE #3. The first short symbol of the two short symbols of the same time resource as that of UE #1 is allocated to UE #2. The second short symbol of the two short symbols of the same time resource as that of UE #1 is allocated to UE #3. UE #4, using type 2s, transmits the DMRS and UCI in two short symbols of the same time resource as that of UE #1.

When the transmission signal of type 1 is multiplexed with one of the transmission signals of type 2, 3, 2s and 3s, the resource for type 1 and the resource for one of type 2, 3, 2s and 3s are preferably time resources or frequency resources that are mutually different.

Figure 16A:
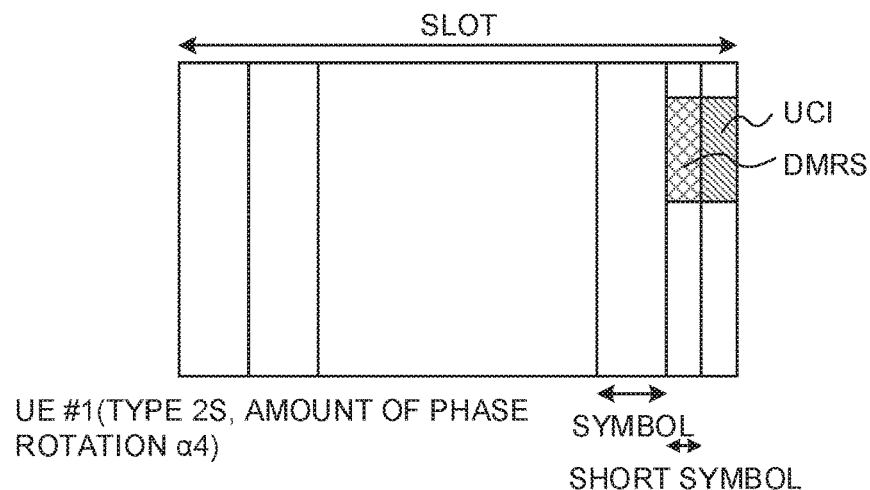
FIGS. 16A to 16C are diagrams to show examples of multiplexing UL control channels for a number of user terminals by using the amount of phase rotation.
Figure 16B:
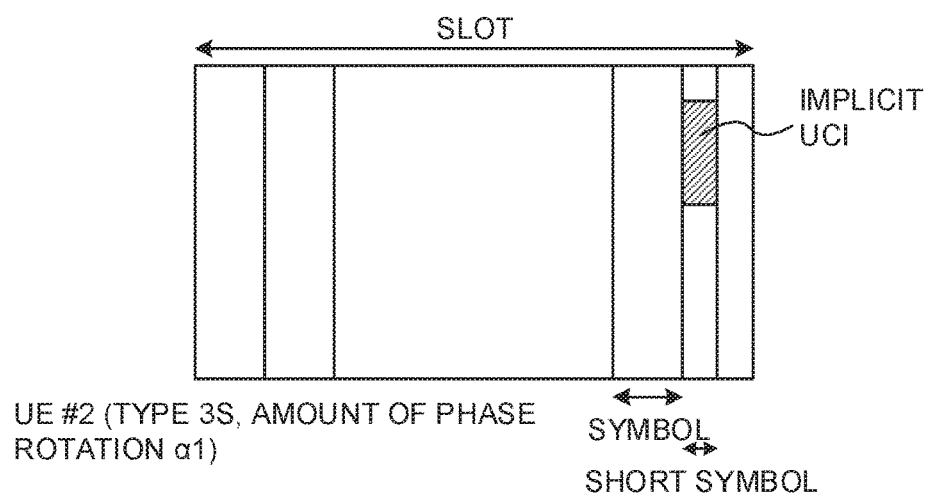
Figure 16C:
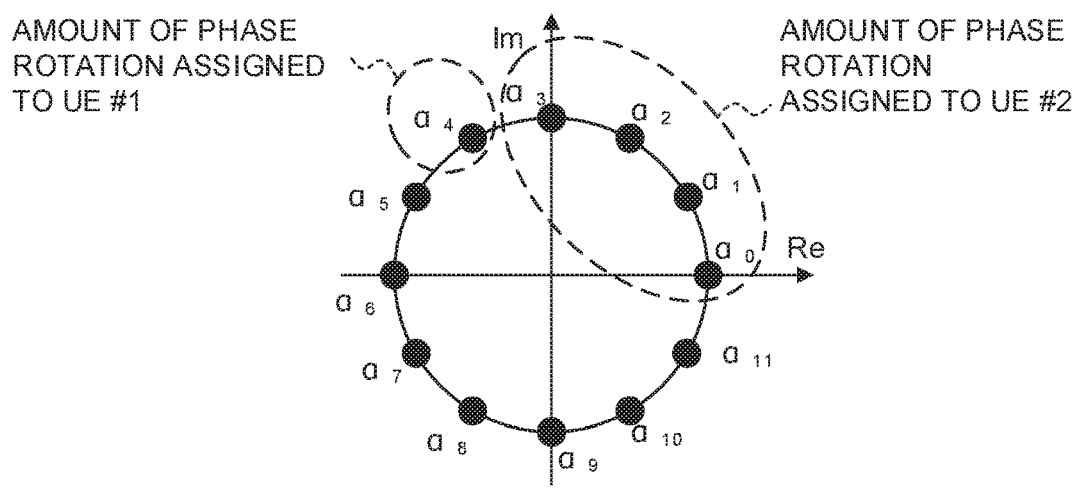

As shown in FIG. 16, amounts of phase rotation to apply to a Zadoff-Chu sequence may be used as orthogonal resources. As shown in FIG. 16C, where a Zadoff-Chu sequence serves as a base sequence, the twelve sequences that are given by rotating the phases of the base sequence through amounts of phase rotation amounts $\alpha_0$ to $\alpha_{11}$ are orthogonal to each other.

As shown in FIG. 16A, when UE #1 uses type 2s, there is no need to select the amount of phase rotation based on the value of UCI. Therefore, as shown in FIG. 16C, one amount of phase rotation (14 is assigned to UE #1. UE #1 transmits the sequence given by rotating the phase of the base sequence through phase rotation amount $\alpha_4$ as the DMRS.

As shown in FIG. 16B, UE #2 uses type 3s, and, where four amounts of phase rotation correspond to four candidate UCI values that can be represented by two bits, selects one that correspond to the UCI's value, and reports two-bit UCI. Therefore, as shown in FIG. 16C, the set of four amounts of phase rotation $\alpha_0$, $\alpha_1$, $\alpha_2$ and $\alpha_3$ is assigned to UE #2. For example, UE #2 selects $\alpha_1$, and transmits the sequence given by rotating the phase of the base sequence through phase rotation amount $\alpha_1$ in the same time resource (short symbol) and frequency resource (PRB) as those of the DMRS of UE #1.

When type 3s is used, multiple orthogonal resources that are used to transmit UCI information, have only to be configured to be orthogonal to each other and be used (in dimension) to transmit information, as when type 3 of the first embodiment is used.

According to the second embodiment described above, the resources that are needed for UL control channels can be reduced, compared to the first embodiment. For example, even if the time, duration of a UL control channel is one symbol, the user terminal car report the DMRS and UCI by using TDM.

Variations

The user terminal may presume transmitting the UL control channel using the same communication scheme as the communication scheme of the UL/DL data channel. In this case, the UL control channel type may be selected based on this communication scheme, so that fewer candidates for the UL control channel type may be provided. In this way, the operation of the user terminal for selecting the UL control channel type can be simplified.

FIG. 17 are diagrams to show examples of methods of UL control channel selection based on the communication scheme of the UL/DL data channel. In this example, there are two candidate UL/DL data channel communication schemes, the user terminal uses two candidate UL control channel types, respectively.

Figure 17A:
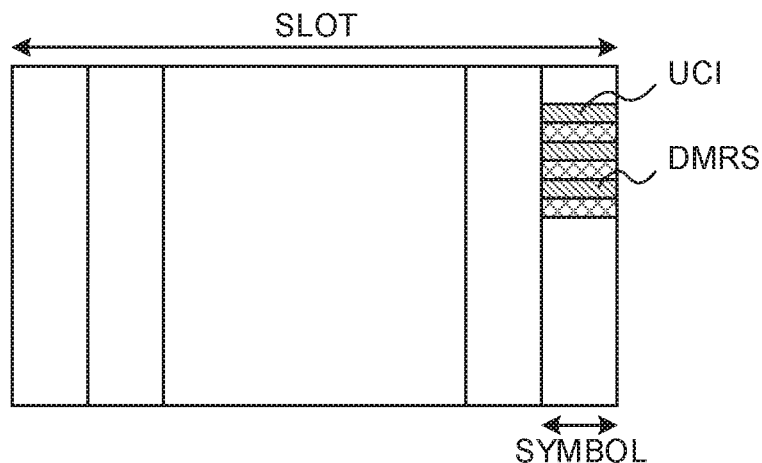
FIGS. 17A and 17B are diagrams show examples of methods of selecting a UL control channel based on the communication scheme for a UL/DL data channel.

If the UL/DL data channel's communication scheme is OFDM, the user terminal may transmit the UL control channel without switching the subcarrier spacing, as shown in FIG. 17A. In this case, the user terminal may select type 1 for the UL control channel.

Figure 17B:
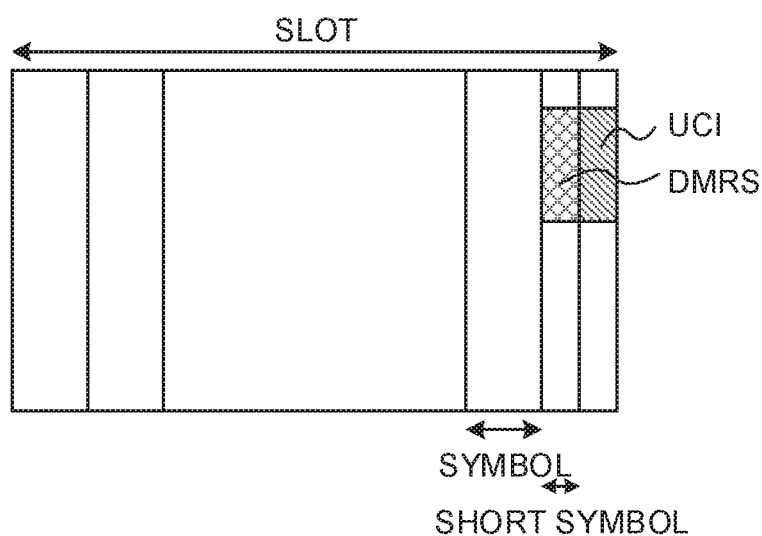

When the UL/DL data channel communication scheme is DFT-S-OFDM, the user terminal may switch the subcarrier spacing and transmit the UL control channel, as shown in FIG. 17B. In this case, the user terminal may select type 2s for the UL control channel. In the examples of FIG. 17, regardless of the communication scheme of the UL/DL data channel, the UL control channel can be transmitted in a time duration of one symbol time.

Several examples of operations of receipt detection based on type 3 and/or type 3s will be described below.

First, the operation of detecting receipt of reported UCI based on the amount phase rotation of the base sequence is described.

The network may detect UCI, from received signals, by using maximum likelihood detection (ML detection) (which may also be referred to as "correlation detection"). To be more specific, the network may generate replicas of each amount of phase rotation (UCI phase rotation amount replicas) assigned to the user terminal (for example, if the number of UCI bits is two bits, the network generates four patterns of replicas), and generate transmission signal waveforms, like the user terminal does, by using base sequences and the UCI phase rotation amount replicas. Also, using all of the UCI phase rotation amount replicas, the network may calculate correlations between the transmission signal waveforms obtained, and the received signal waveforms received from the user terminal, and assume that the UCI replica to show the highest correlation has been transmitted.

For example, the network generates transmission signal sequences (M complex-number sequences) by applying phase rotation to the base sequence based on UCI phase rotation amount replicas. The network multiplies the received signal sequences (M complex-number sequences) after the DFT, having a size of M, by the complex conjugates of the transmission signal sequences, on an element by element basis, and calculates the likelihood by summing up the M resulting sequences. The likelihood may be the sum of the squares of the absolute values of the multiplication results of the transmitted signal sequences and the received signal sequences per element, or may be the sum of the absolute values of the multiplication results of the transmitted signal sequences and the received signal sequences per element. The network may assume that the UCI value corresponding to the UCI phase rotation amount replica that produced the maximum likelihood, among all the UCI phase rotation amount replicas, has been transmitted.

Alternatively, the network may perform channel estimation using UCI phase rotation amount replicas (for example, perform channel estimation four times if the UCI is two bits), perform the demodulation and error detection (or error correction) of the UCI based on the results of channel estimation, and detect the UCI by specifying a UCI phase rotation amount replica where no error is detected (or where error is detected in few bits).

Even when a number of user terminals are multiplexed, since received signals from these UEs are orthogonal to each other, the network can detect UCI based on, for example, the amount of phase rotation assigned to a specific user terminal.

Next, the operation of detecting receipt in the event UCI is reported by selecting time resources and/or frequency resources will be described.

The network may measure the received power of multiple time and frequency resources that are allocated to (reserved for) the user terminal, and, on assumption that a signal has been transmitted in the resource where the maximum received power was measured, the network may identify the UCI corresponding to this resource.

The UL control channel does not have to be placed in the last symbol of the slot, and may be placed in any symbol or any short symbol. The time resources allocated to the UL control channel may be reported from the network. Furthermore, the time resource may be indicated by the number of the symbol from the top of the slot, gray be indicated by the number of the short symbol from the top of the slot, or may be indicated by the combination of the number of the symbol from the top of the slot and the number of the short symbol from the top of the symbol corresponding to the number of the symbol. Instead of the number of the symbol from the top of the slot, the number of the symbol from the top of the subframe may be used.

Figures 18A, 18B, 18C:
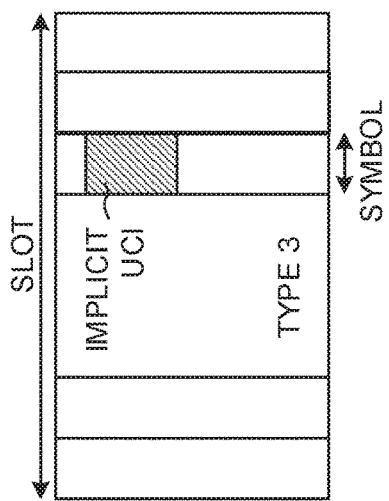
FIGS. 18A to 18F are diagrams to show examples of UL control channels placed in the second and/or third symbol from the end of a slot.
Figures 18D, 18E, 18F:
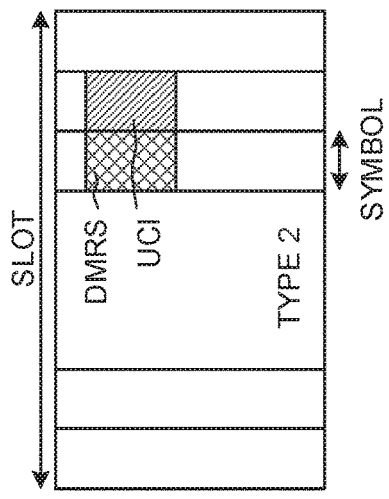
Figure 19A:
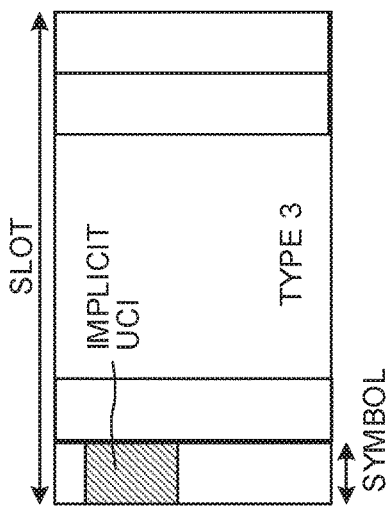
FIGS. 19A to 19F are diagrams to show examples UL control channels placed in the first and/or second symbol from the beginning of a slot.
Figure 19B:
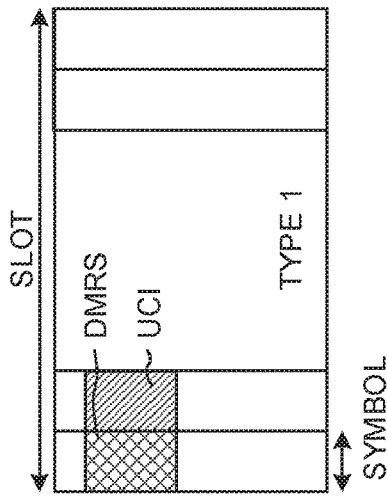
Figure 19C:
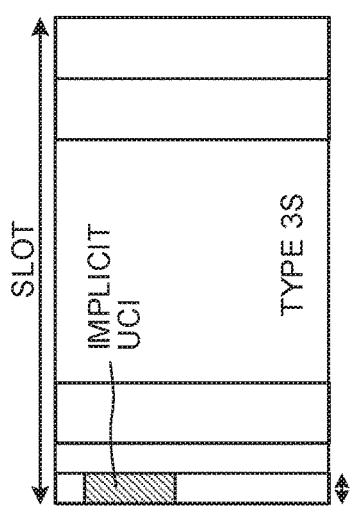
Figure 19D:
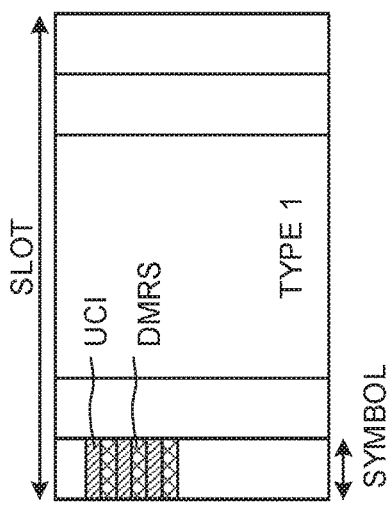
Figure 19E:
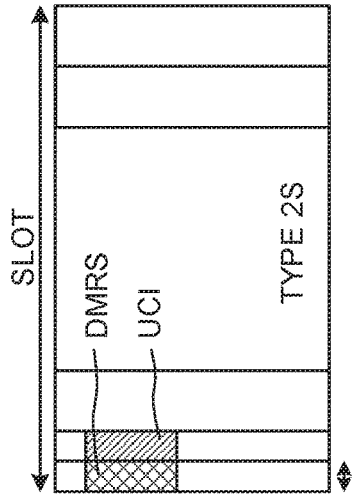
Figure 19F:
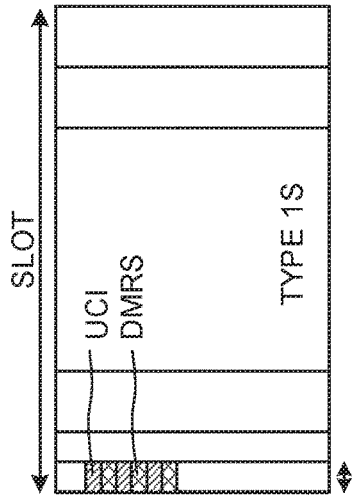

FIG. 18 are diagrams to show examples of IL control channels placed in the second and/or the third symbol from the end of the slot. As shown in FIG. 18A, the UL control channel of type 1 may be placed in the second symbol from the end of the slot. As shown in FIG. 18B, the UL control channel of type 2 may be placed over the second and third symbols from the end of the slot. As shown in FIG. 18C, the UL control channel of type 3 may be placed in the third symbol from the end of the slot. As shown in FIG. 18D, the UL control channel of type 1s may be placed in the second short symbol in the second symbol from the end of the slot. As shown in FIG. 18E, the UL control channel of type 2s may be placed over two short symbols in the second symbol from the end of the slot. As shown in FIG. 18F, the UL control channel of type 3s may be placed in the first short symbol in the second symbol from the end of the slot.

In this case, type 2 and type 3 may be multiplexed on overlapping resources (for example, time and frequency resources) in the same carrier and the same slot, or type 2s and type 3s may be multiplexed on overlapping resources (for example, time and frequency resources) in the same carrier and the same slot.

FIG. 19 are diagrams to show examples of UL control channels placed in the first and/or second symbol from the top of the slot. As show in FIG. 19A, the UL control channel of type 1 may be placed in the first symbol from the top of the slot. As shown in FIG. 19B, the UL control channel of type 2 may be placed over the first and second symbols from the top of the slot. As shown in FIG. 19C, the UL control channel of type 3 may be placed in the first symbol from the top of the slot. As shown in FIG. 19D, the UL control channel of type is may be placed in the first short symbol in the first symbol from the top of the slot. As shown in FIG. 19E, the UL control channel of type 2s may be placed over two short symbols in the first symbol from the top of the slot. As shown in FIG. 19F, the UL control channel of type 3s may be placed in the first short symbol in the first symbol from the top of the slot.

In this case, type 2 and type 3 may be multiplexed on overlapping resources (for example, time and frequency resources) in the same carrier and the same slot, or type 2s and type 3s may be multiplexed on overlapping resources (for example, time and frequency resources) in the same carrier and the same slot.

As illustrated FIG. 18 and FIG. 19, even when UL control channels are transmitted in various methods in arbitrary symbols, it is possible to report UCI using suitable methods.

Note that, although examples have been shown with type 1 and/or type 1s where the DMRS and UCI are placed in the shape of comb teeth in the frequency domain, this arrangement is not limiting.

Also, although examples have been shown with type 2 and/or type 2s where the DMRS and UCI are placed in the order of the DMRS and UCI, in the time domain, this arrangement is not limiting. For example, at least part of the DMRS used to demodulate UCI may be transmitted after the UCI.

Note that, in each of the above embodiments, OFDM may be more generalized and replaced by a multi-carrier communication scheme, and DFT-S-OFDM may be more generalized and replaced by a single-carrier communication scheme.

Radio Communication System

Now, the structure of the radio communication system according to one embodiment of the present invention will be described below. In this radio communication system, communication is performed using one or a combination of the radio communication methods according to the herein-contained embodiments of the present invention.

Figure 20:
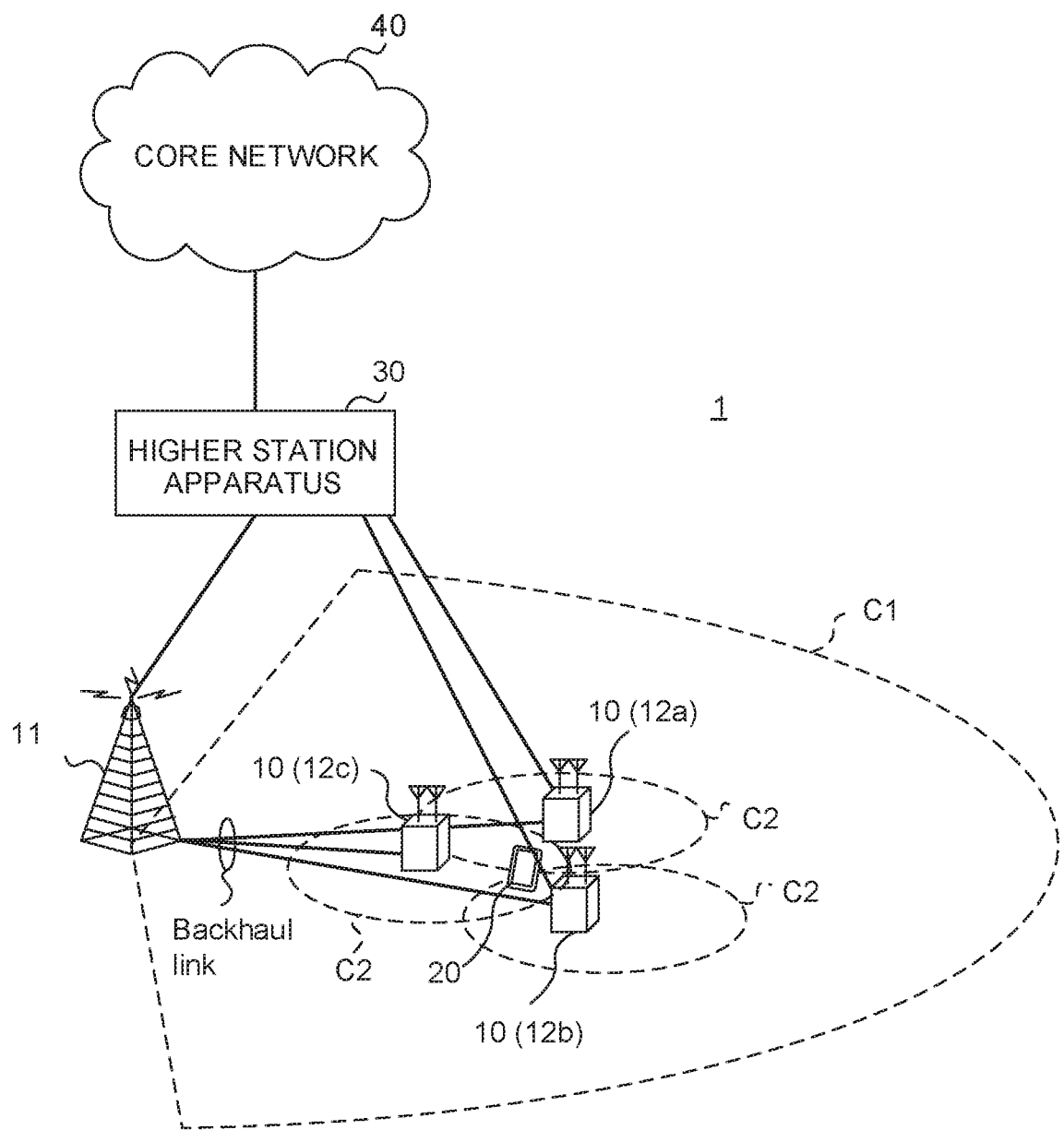
FIG. 20 is a diagram to show an example of a schematic structure of a radio communication system according to one embodiment of the present invention.

FIG. 20 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G, "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, which has a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement of cells and user terminals 20 is not limited to that shown in the drawing.

The user terminals 20 can connect with both the radio base station 11 and the radio base stations 12. The user terminals 20 may use the macro cell C1 and the small cells C2 at the same e by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a earner of a relatively high frequency band (for example, 3.5 GHz, 5 GHz and so on) and a wide bandwidth may be used, or the same carrier as that used in the radio base station 11 may be used. Note that the structure of the frequency band for se in each radio base station is by no means limited to these.

A structure may be employed here in which wire connection example, or means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to this combination, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast Channel)), downlink L1/L2 control channels and so on are used as downlink channels. User data, higher layer control information and SIBS (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PDSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

Radio Base Station

Figure 21:
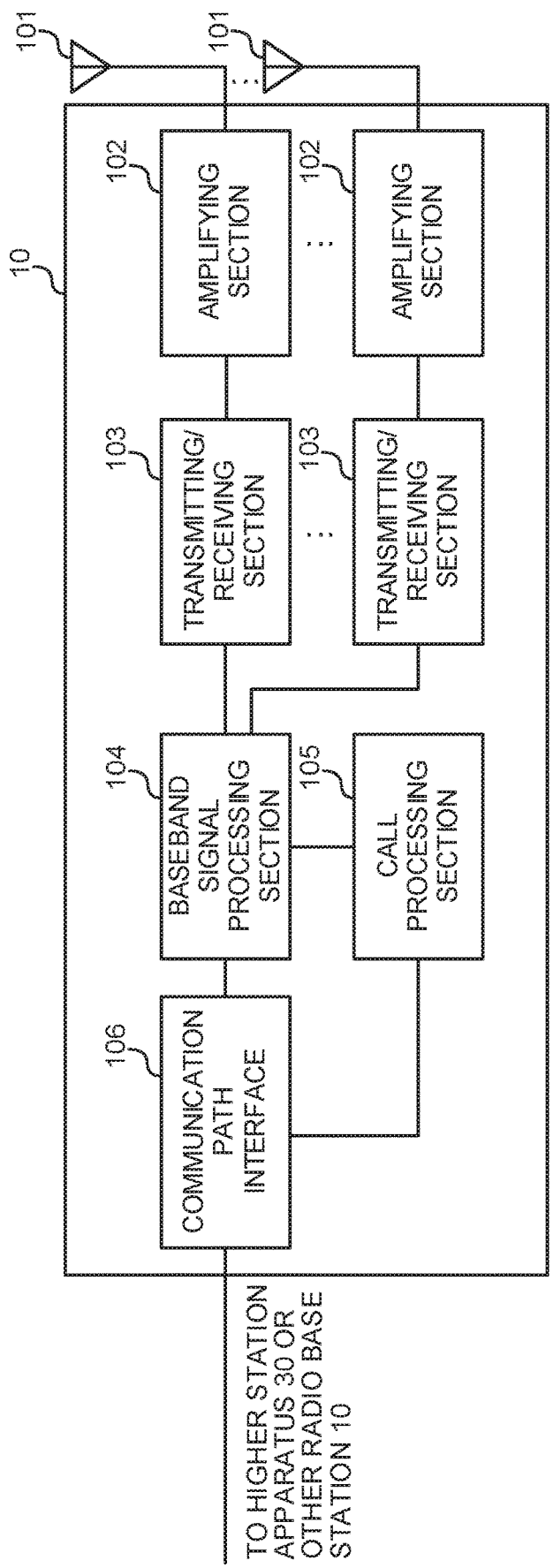
FIG. 21 is a diagram to show an example of an overall structure of a radio base station according to one embodiment of the present invention.

FIG. 21 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a preceding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 receive an uplink control channel signal in a predetermined resource that is allocated to the user terminal 20, in a control section 301, which will be described later.

The transmitting/receiving sections 103 may transmit the reporting method (for example, the UL control channel type), parameters to configure in the user terminal, information about the resources to be allocated to the user terminal and so forth, to the user terminal 20.

Figure 22:
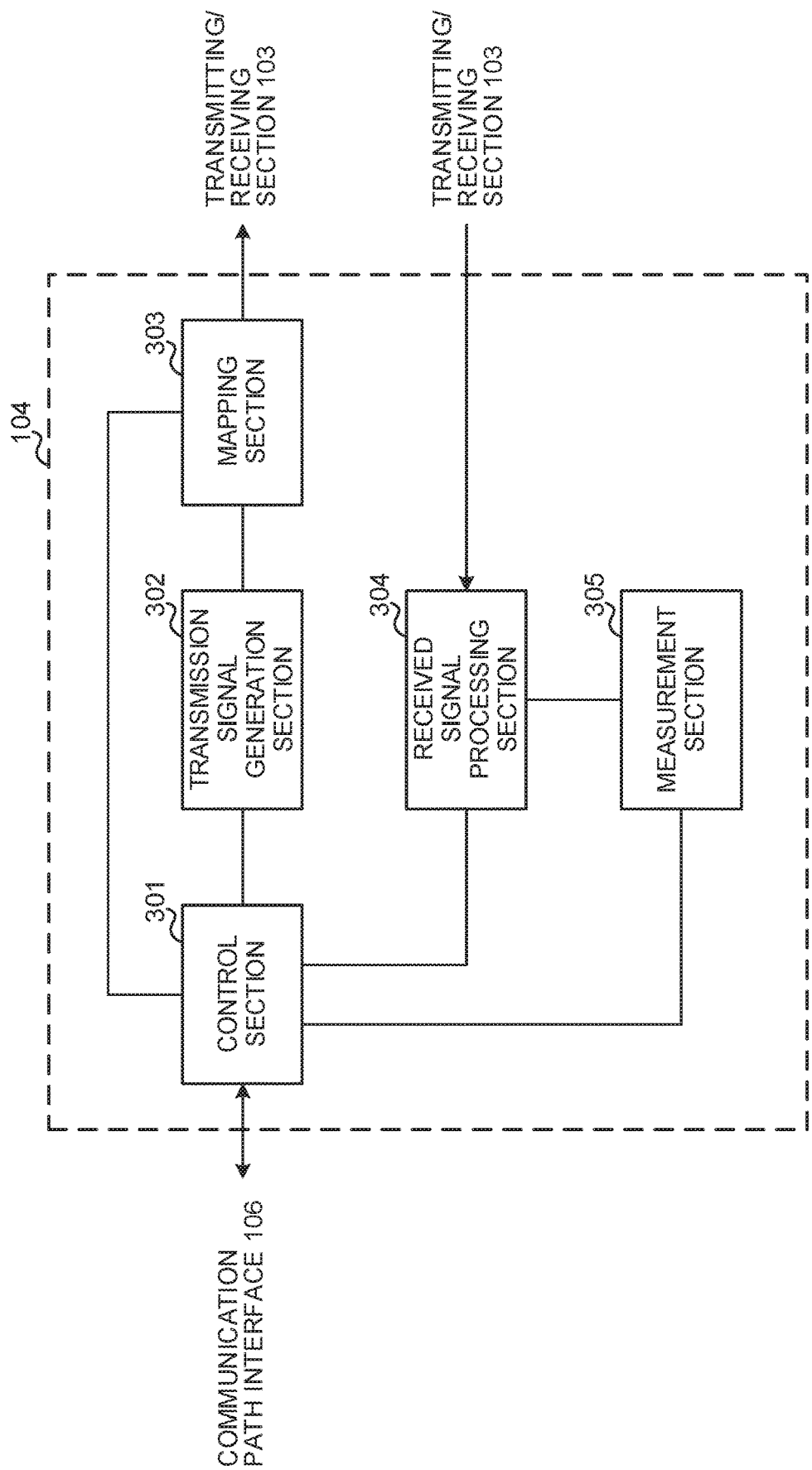
FIG. 22 is a diagram to show art example of a functional structure of a radio base station according to one embodiment of the present invention.

FIG. 22 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals communicated in the PDSCH and/or the EPDCCH). Also, the control section 301 controls the generation of downlink control signals (for example, delivery acknowledgement information and so on), downlink data signals and so on, based on whether or not retransmission control is necessary, which is decided in response to uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DM-RS, etc.) and so on.

In addition, the control section 301 controls the scheduling of uplink data signals (for example, signals transmitted in the PUSCH), uplink control signals (for example, signals transmitted in the PUCCH and/or the PUSCH), random access preambles transmitted in the PRACH, uplink reference signals, and so on.

In addition, the control section 301 may exert control so that resources for reporting UL control information are allocated to the user terminals 20. Also, when resources for reporting UCI are allocated to a number of user terminals, the control section 301 may allocate resources that are orthogonal to each other, to multiple user terminals.

The control section 301 may evaluate uplink control information based on processing results in the received signal processing section 304, or evaluate uplink control information that is associated with resources and reported implicitly from the user terminal 20, based on measurement results (for example, received power measurement results) obtained in the measurement section 305.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signal. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the power strength (for example, RSSI (Received Signal Strength Indicator)), uplink channel information (for example, CSI) and so on. The measurement results may be output to the control section 301.

User Terminal

Figure 23:
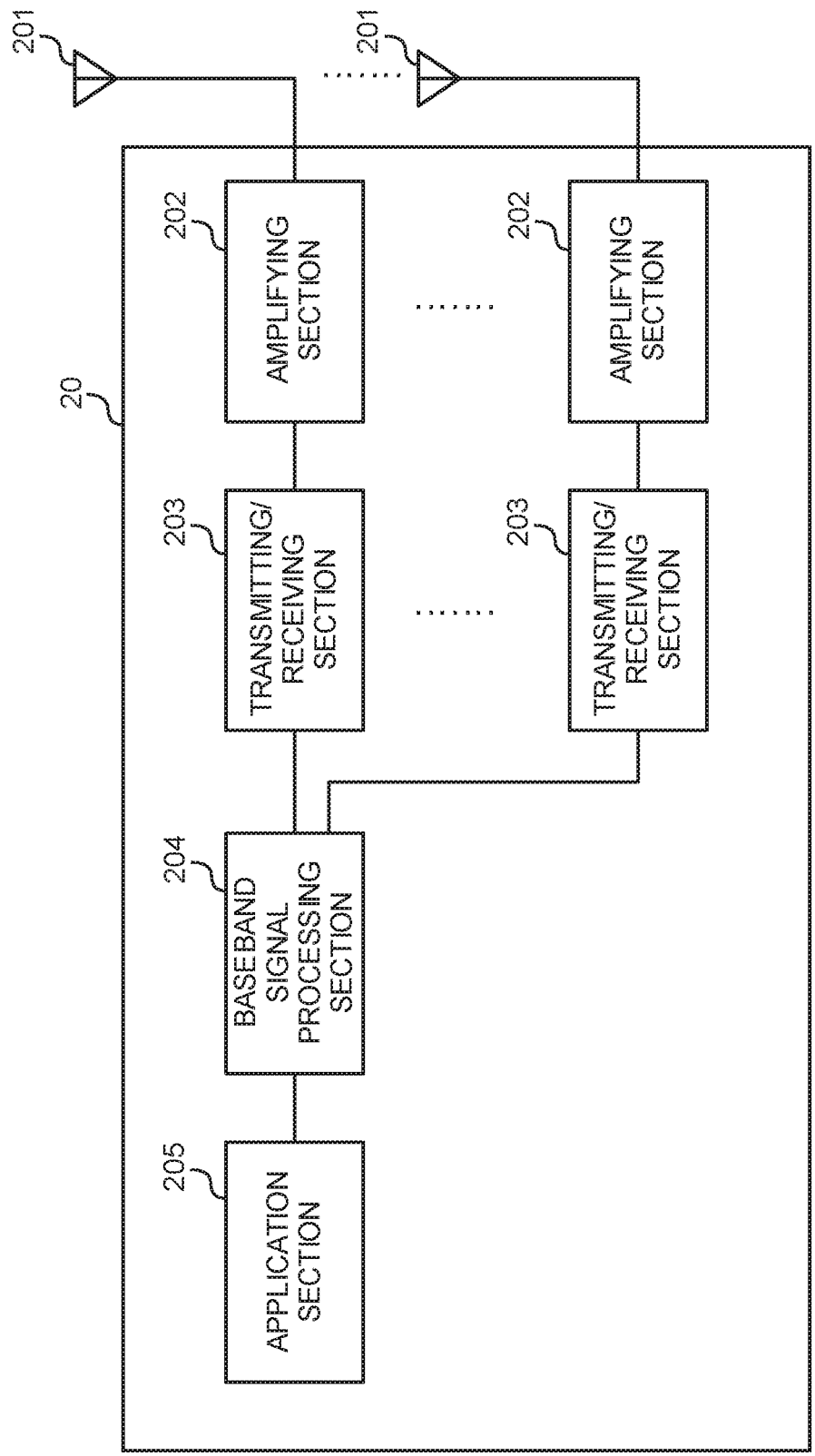
FIG. 23 is a diagram to show an example of an overall structure of a user terminal according to one embodiment of the present invention.

FIG. 23 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/ receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

721// The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 transmits a transmission signal according to one reporting method selected from a number of reporting methods in a control section 401, which will be described later. The multiple reporting methods include at least two of a first reporting method (for example, type 1, type 1s, etc.), in which a control signal to represent uplink control information and the reference signal for demodulating the uplink control information are frequency-division-multiplexed and the resulting transmission signal is transmitted in an uplink control channel, a second reporting method (for example, type 2, type 2s, etc.), in which the control signal and the reference signal are time-division-multiplexed and the resulting transmission signal is transmitted in the uplink control channel, and a third reporting method (for example, type 3, type 3s, etc.), in which a transmission signal, not containing the reference signal, is transmitted in the uplink control channel, by using a resource that corresponds to the value of the uplink control information among a plurality of resources allocated. Note that the reference signal here may be also referred to as the "reference signal demodulating control signals or uplink control channels."

The above reporting methods may include a fourth reporting method (for example, type 2s), in which the transmission signal given by time-division-multiplexing the control signal and the reference signal is transmitted by using subcarrier spacing of an integer multiple of the subcarrier spacing used in the second reporting method (for example, type 2).

In the same time resource and frequency resource as those of the signal transmitted by another user terminal, the transmitting/receiving sections 203 may transmit the reference signal based on the second reporting method or the transmission signal based on the third reporting method, by using a resource that is orthogonal to the signal transmitted by the other user terminal.

Figure 24:
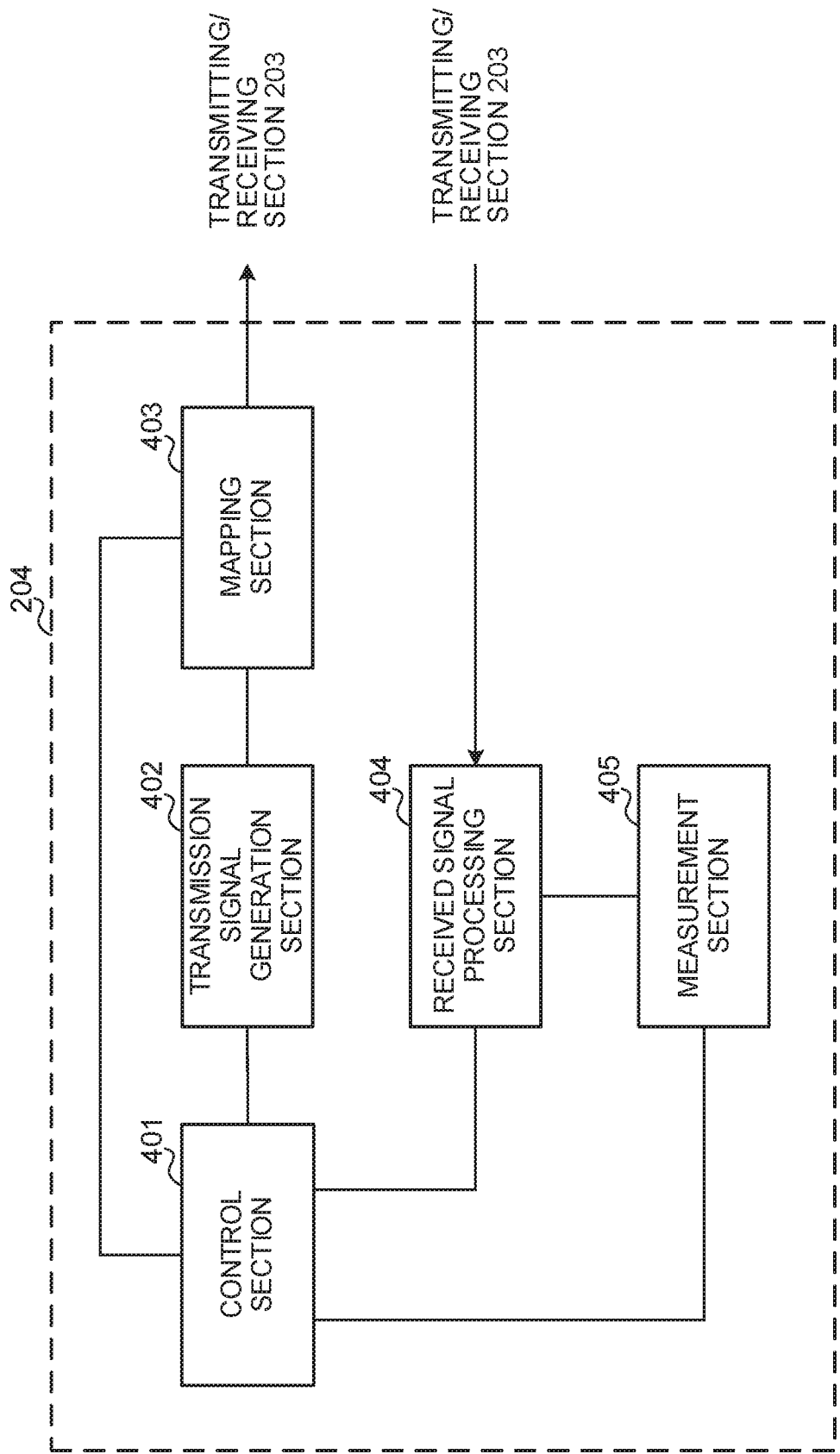
FIG. 24 is a diagram to show an example of a functional structure of a user terminal according to one embodiment of the present invention.

FIG. 24 is a diagram to show an example of a functional structure of a user terminal according to the present embodiment. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a napping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires downlink control signals (for example, signals transmitted in the PDCCH/EPDCCH) and downlink data signals (for example, signals transmitted in the PDSCH) transmitted from the radio base station 10, via the received signal processing section 404. The control section 401 controls the generation of uplink control signals (for example, delivery acknowledgement information and so on) and/or uplink data signals based on whether or not retransmission control is necessary, which is decided in response to downlink control signals and/or downlink data signals, and so on.

The control section 401 selects one reporting method out of a number of reporting methods. Furthermore, the control section 401 may exert control so that a transmission signal of the selected reporting method (which herein is also referred to as a "transmission signal using the reporting method," a "transmission signal based on the reporting method," and so on) is transmitted.

The control section 401 may select the reporting method based on at least one of the communication scheme for the uplink control channel, the communication scheme for the downlink control channel, the communication scheme for the uplink data channel, the communication scheme for the downlink data channel, the e duration of the uplink control channel, and the capability of the user terminal 20.

In addition, when various pieces of information reported from the radio base station 10 are acquired from the received signal processing section 404, the control section 401 may update the parameters used for control based on the information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate are uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. For example, the measurement section 405 performs measurements using downlink reference signals transmitted from the radio base station 10. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, etc.), the power strength (for example, RSSI) downlink channel information (for example, CSI), and so on. The measurement results may be output to the control section 401.

Hardware Structure

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 25:
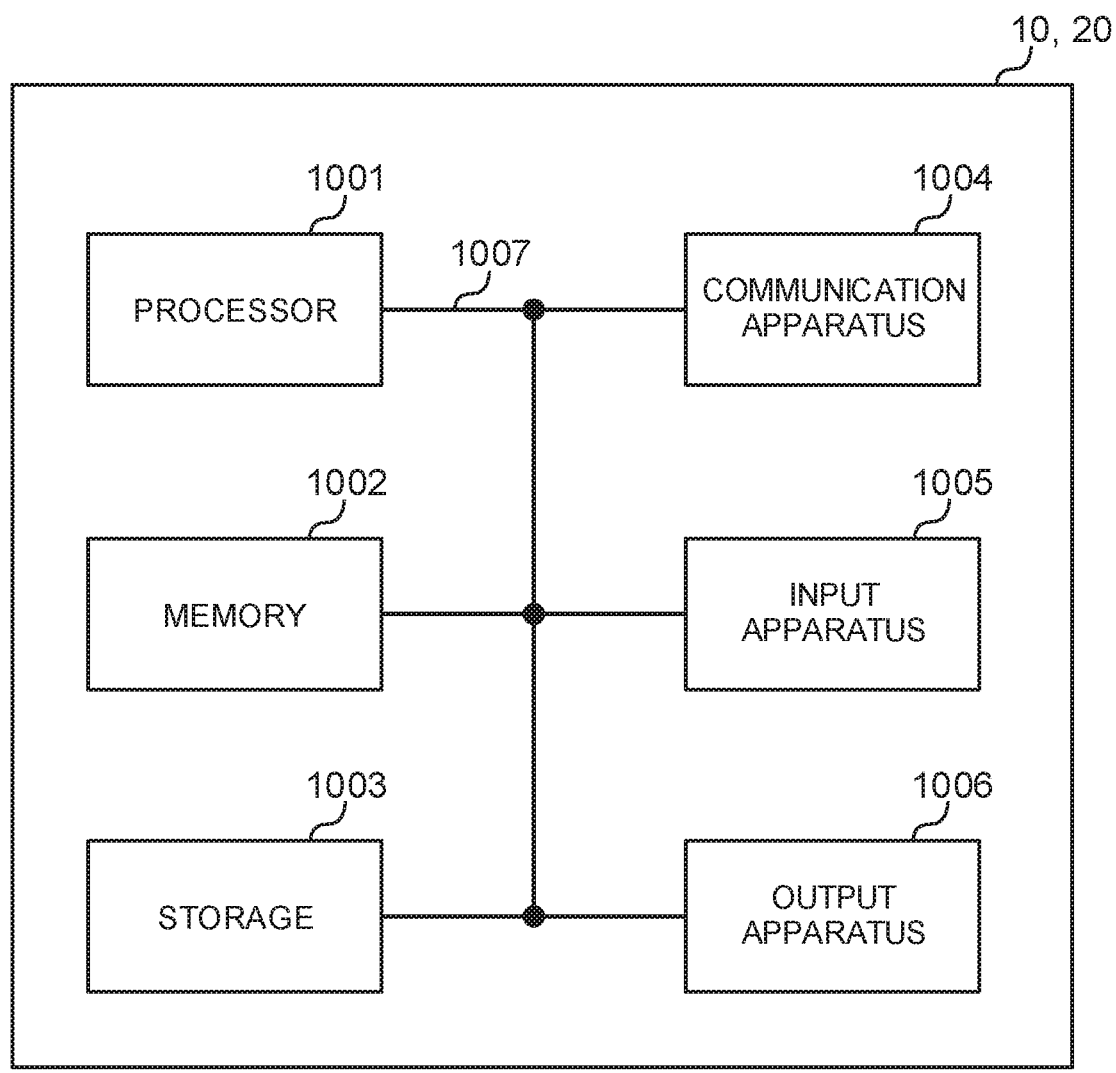
FIG. 25 is a diagram to show an example hardware structure of a radio base station and a user terminal according to one embodiment of the present invention.

For example, the radio base station, user terminals and so on according to one embodiment of the present invention may function as a computer that executes the processes of the radio communication method of the present invention. FIG. 25 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or stay be designed not to include part of the apparatus.

For example, although only one processor 1001 is shown, a plurality of processors may be provided. Furthermore, processes may be implemented with one processor, or processes may be implemented either simultaneously or in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk, a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Variations

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, "component carrier (CC)" may be referred to as a "cell," a "frequency carrier," a "carrier frequency" and so on.

Furthermore, a radio frame may be comprised of one or more periods (frames) in the time domain. Each of one or lore periods (frames) constituting a radio frame may be referred to as a "subframe." Furthermore, a subframe may be comprised of one or more slots in the time domain. A subframe may be a fixed time duration (for example, one ms) not dependent on the neurology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on neurology. Also, a slot may include a plurality of minislots. Each minislot may consist of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or minislot may be referred to as a "TTI." That is, a subframe and/or a TTI may be a subframe (one ms) in existing LTE, may be a shorter period than one ms (for example, one to thirteen symbols), or may be a longer period of time than one ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when one slot or one minislot is referred to as a "TTI," one or more TTIs (that is, one or more slots or one or more minislots) may be the minimum time unit of scheduling. Also, the number of slots (the number of minislots) to constitute this minimum time unit of scheduling may be controlled.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI (or a "fractional TTI")," a "shortened subframe," a "short subframe," a "minislot," "a sub-slot" and so on.

Note that a long TTI (for example, a normal TTI, a subframe, etc.) may be replaced with a TTI having a time duration exceeding one ms, and a short TTI (for example, a shortened TTI) may be replaced with a TTI having a TTI length less than the TTI length of a long TTI and not less than one ms.

A resource block (RB) is the unit of resource allocation in the time domain and the frequency domain, and may include one or a plurality of consecutive sub carriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots per subframe or radio frame, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical signaling (for example, downlink control information (DCI), uplink control information (UCI)), higher layer signaling (for example, RRC (Radio Resource Control) signaling, broadcast information (the master information block MIB), system information blocks (SIBS) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "less unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or marc elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a transmitter that transmits uplink control information on an uplink control channel; and
   a controller that determines an uplink control channel format for the transmission of the uplink control information based on a number of symbols of the uplink control channel,
   wherein:
      when the uplink control channel format is a first uplink control channel format, the controller determines a sequence based on a cyclic shift that depends on the uplink control information, maps the sequence within first resource blocks assigned for the uplink control channel, and does not map a demodulation reference signal within the first resource blocks, and
      when the uplink control channel format is a second uplink control channel format other than the first uplink control channel format, the controller maps a demodulation reference signal within second resource blocks assigned for the uplink control channel and does not map the sequence within the second resource blocks.

2. The terminal according to claim 1, wherein if the uplink control information transmitted using the first uplink control channel format comprises 2 bits, then an interval between each of four cyclic shifts is a constant, and the four cyclic shifts are respectively based on four values of the 2 bits.

3. The terminal according to claim 2, wherein the uplink control information, which is transmitted using the first uplink control channel format, is transmitted over 1 symbol, and the number of bits of the uplink control information is 2.

4. The terminal according to claim 1, wherein the uplink control information, which is transmitted using the first uplink control channel format, is transmitted over 1 symbol, and the number of bits of the uplink control information is 2.

5. The terminal according to claim 1, wherein the controller determines the uplink control channel format for the transmission of the uplink control information based on the number of symbols of the uplink control channel, from the first uplink control channel format and the second uplink control channel format.

6. A radio communication method for a terminal comprising:
- transmitting uplink control information on an uplink control channel; and
- determining an uplink control channel format for the transmission of the uplink control information based on a number of symbols of the uplink control channel, wherein:
- when the uplink control channel format is a first uplink control channel format, the terminal determines a sequence based on a cyclic shift that depends on the uplink control information, maps the sequence within first resource blocks assigned for the uplink control channel, and does not map a demodulation reference signal within the first resource blocks, and
- when the uplink control channel format is a second uplink control channel format other than the first uplink control channel format, the terminal maps a demodulation reference signal within second resource blocks assigned for the uplink control channel and does not map the sequence within the second resource blocks.

7. A system comprising:
a terminal that comprises:
- a transmitter that transmits uplink control information on an uplink control channel; and
- a controller that determines an uplink control channel format for the transmission of the uplink control information based on a number of symbols of the uplink control channel; and a base station that receives the uplink control information on the uplink control channel, wherein:
- when the uplink control channel format is a first uplink control channel format, the controller determines a sequence based on a cyclic shift that depends on the uplink control information, maps the sequence within first resource blocks assigned for the uplink control channels, and does not map a demodulation reference signal within the first resource blocks, and
- when the uplink control channel format is a second uplink control channel format other than the first uplink control channel format, the controller maps a demodulation reference signal within second resource blocks assigned for the uplink control channel and does not map the sequence within the second resource blocks.

* * * * *